United States Patent [19]

Isaacs

[11] Patent Number: 5,798,761
[45] Date of Patent: Aug. 25, 1998

[54] ROBUST MAPPING OF 2D CURSOR MOTION ONTO 3D LINES AND PLANES

[75] Inventor: Paul M. Isaacs, San Francisco, Calif.

[73] Assignee: Silicon Graphics, Inc., Mountain View, Calif.

[21] Appl. No.: 592,632

[22] Filed: Jan. 26, 1996

[51] Int. Cl.$^6$ .................................................. G06T 13/00
[52] U.S. Cl. ........................................... 345/419; 345/425
[58] Field of Search ................................. 345/419, 425, 345/427, 428, 429, 430

[56] References Cited

PUBLICATIONS

Nielson, Gregory M and Dan R. Olsen, Jr., "Direct Manipulation Techniques for 3D Objects Using 2D Locator Devices", *Interactive 3D Graphics*, Oct. 23–24, 1986, pp. 175–182.

Chen, Michael, S. Joy Mountford, and Abigail Sellen, "A Study in Interactive 3–D Rotation Using 2–D Control Devices", *Computer Graphics*, Aug. 1988, vol. 22, No. 4, pp. 121–129.

Gleicher, Michael and Andrew Witkin, "Through–the–Lens Camera Control", *Computer Graphics*, Jul. 1992, vol. 26, No. 2, pp. 331–340.

Conner, D. Brookshire, Scott S. Snibbe, Kenneth P. Herndon, Daniel C. Robbins, Robert C. Zeleznik, and Andries van Dam, "Three Dimensional Widgets", Computer Graphics Special issue on 1992 Symposium on Interactive 3D Graphics, ACM, Mar. 1992, pp. 183–188.

Shoemake, Ken, "Archball: A User Interface for Specifying Three–Dimensional Orientation Using a Mouse", Math for SIGGRAPH, *Math for SIGGRAPH: SIGGRAPH 1991 Course Notes #2*, May 30, 1991, pp. B–37 to B–43.

Open Inventor Architecture Group, *Open Inventor™ C++ Reference Manual: The Official Reference Document for Open Inventor, Release 2*, 1994, pp. 34, 35, 44, 45, 48, 216–220, 507–509, 521–532, 686–691.

Wernecke, Josie, Open Inventor Architecture Group, *The Inventor Mentor: Programming Object–Oriented 3D Graphics with Open Inventor, Release 2*, 1994, pp. 390–400, 411–414.

Wernecke, Josie, Open Inventor Architecture Group, *The Inventor Toolmaker: Extending Open Inventor™, Release 2*, 1994, pp. 151–176.

*Primary Examiner*—Phu K. Nguyen
*Assistant Examiner*—Cliff N. Vo
*Attorney, Agent, or Firm*—Fish & Richardson P.C.

[57] ABSTRACT

A moving 2D cursor is mapped onto a guiding entity in a virtual 3D space displayed on a 2D surface by determining if the guiding entity has a characteristic that may yield a discontinuity in motion along the guiding entity when the moving cursor is mapped onto the guiding entity. The cursor is mapped onto the guiding entity based on a result of the determining.

22 Claims, 21 Drawing Sheets

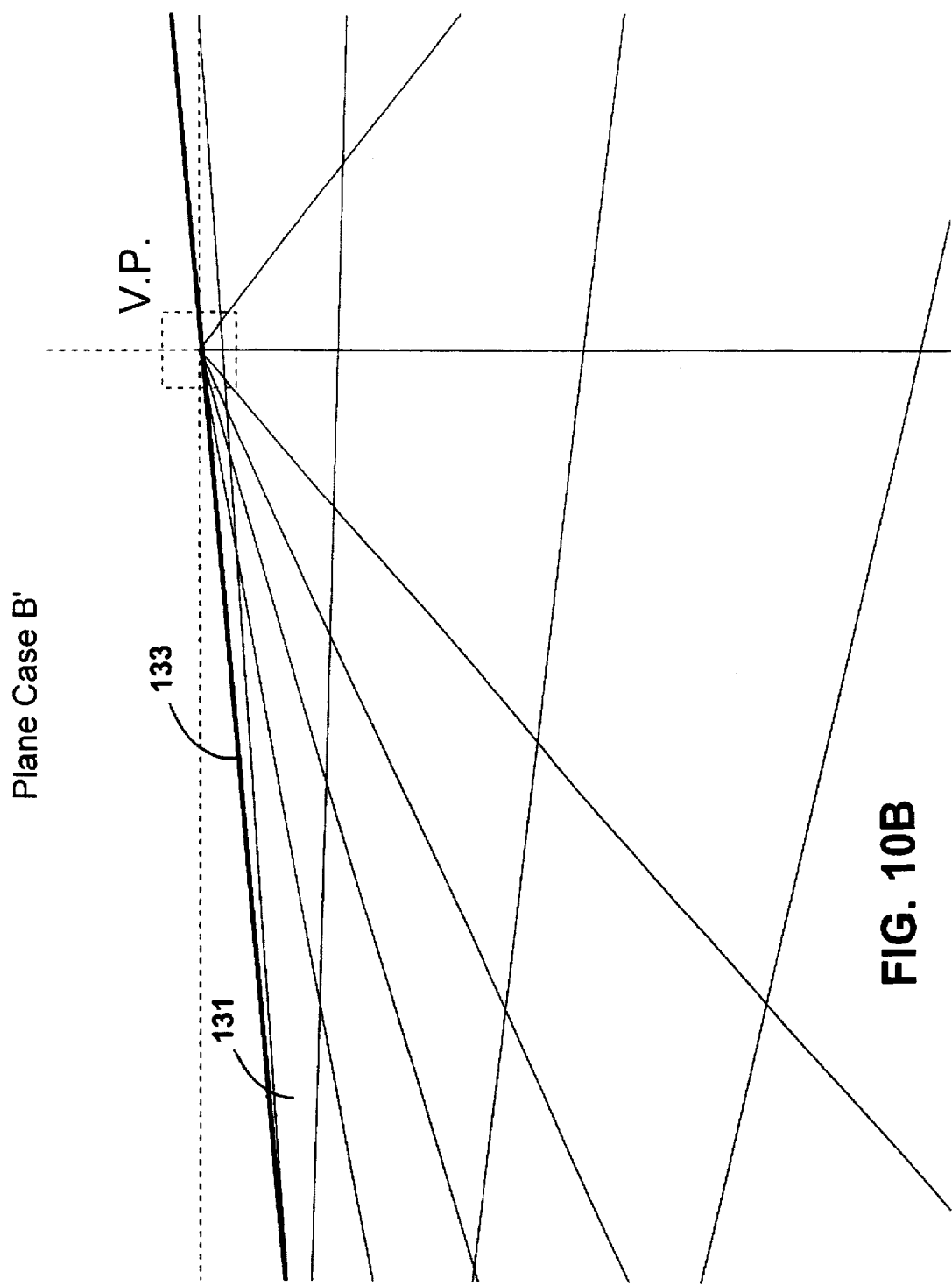

ROBUST MAPPING OF 2D CURSOR MOTION ONTO 3D LINES AND PLANES

BACKGROUND

This invention relates to mapping 2D cursor locations into virtual 3D scenes.

Cursor mapping is used, for example, to transform a user's 2D cursor motions into corresponding motion of a 3D object along a guide line or a guide plane on a display. Widgets—objects that provide user-interface abstractions—are one of the types of 3D objects that a user may be interested in manipulating using 2D cursor motions. Mapping of a 2D cursor to 3D object motion has been discussed by Michael Chen, S. Joy Mountford, and Abigail Sellen in "A Study in Interactive 3-D Rotation Using 2-D Control Devices," Computer Graphics (SIGGRAPH 1988 Proceedings), 22(4) pp. 121–29 (August 1988); Michael Gleicher and Andrew Witkin in "Through-the-Lens Camera Control," Computer Graphics (SIGGRAPH 1992 Proceedings), 26(2) pp. 331–40 (July 1992); Gregory Nielson and Dan Olsen Jr. in "Direct Manipulation Techniques for 3D Objects Using 2D Locator Devices," Proceedings 1086 Workshop on Interactive Graphics, ACM, New York, 1987, pp. 175–82; Ken Shoemake in "Math For SIGGRAPH", SIGGRAPH 1991 course notes #2; Josie Wernecke in *The Inventor Mentor*, Addison-Wesley (1994); Josie Wernecke in *The Inventor Toolmaker*, Addison-Wesley (1994); and D. Brookshire Conner, Scott C. Snibbe, Kenneth P. Herndon, Daniel C. Robbines, Robert C. Zeleznik, and Andries van Dam in "Three-Dimensional Widgets," Computer Graphics Special issue on 1992 Symposium on Interactive 3D Graphics, pp. 183–88 (March 1992).

Among products that use 3D widgets are Brown University's "3D Widgets"; Softimage's Modeler; Wavefront's Modeler; Alias Research's "Alias Sketch" modelling software; Radiance Software International's "EZ3D" modeling software; Caligari, Inc.'s "TrueSpace" modeling software; Silicon Graphics, Inc.'s "Showcase 3.0" drawing software; and Howard Look's "Curve" SGI Demo Program.

In known schemes, objects that are intended to move beneath the cursor but be constrained to move along a guiding line or within a guiding plane may fly to unexpected locations or disappear entirely. This happens when the cursor is taken to a screen location that does not lie in the guiding plane or on the guiding line.

SUMMARY

A moving 2D cursor is mapped onto a guiding entity in a virtual 3D space displayed on a 2D surface by determining if the guiding entity has a characteristic that may yield a discontinuity in motion along the guiding entity when the moving cursor is mapped onto the guiding entity. The cursor is mapped onto the guiding entity based on a result of that determination.

An object may be manipulated along the guiding entity based on this mapping. Alternatively, the object may be rotated, scaled, or translated based on the mapping. The object need not be on the guiding entity for these operations to take place.

The guiding entity may be a line and the characteristic may be a vanishing point. Alternatively, the guiding entity may be a plane and the characteristic may be a horizon line.

Mapping of the cursor may include finding a location on the guiding entity that is closest to the 2D cursor position in screen space. The mapping may also include limiting the mapped position on the guiding entity to a constrained region, for example, lying between a view plane and either a horizon line or a vanishing point, inclusive. Alternatively, the constrained region may lie between an appearing position and a clamped position, inclusive. In either case, the limiting may be such that it permits an object moving along the guiding entity to be seen and manipulated.

In another embodiment, 2D cursor coordinates are mapped onto a guiding entity in 3D space by determining a point on the guiding entity that is closest to the 2D cursor position in screen space. A mapped position on the guiding entity is chosen based on a result of that determination. The mapped position may correspond to a point on the guiding entity at which a perpendicular line can be drawn to the 2D cursor position. The mapped position may be modified such that a 3D object placed at the modified mapped position is between a view plane and a point beyond which the 3D object cannot be seen and manipulated.

In another embodiment, a 2D position of a displayed cursor is mapped to a position of a 3D object on a guiding element that lies within a displayed virtual 3D space by determining if the mapped position of the 3D object on the guiding element would render the object imperceptible or not manipulatable. If so, the mapped position is shifted to one at which the 3D object would be perceptible or manipulatable. The mapped position on the guiding entity may lie between an appearing point and a clamped vanishing point, inclusive.

In another embodiment, 2D cursor coordinates are mapped onto a guiding entity in 3D space by determining a point on the guiding entity at which it intersects a view plane. The mapped position on the guiding entity is chosen based on the 2D cursor position and on a result of that determination.

In yet another embodiment, 2D cursor coordinates are mapped onto a guiding line in 3D space by determining a direction of the guiding line in affine space and finding a vanishing point for the guiding line by constructing a line in affine space that passes through an eye point and that has the same direction as the guiding line. A mapped position on the guiding line is chosen based on the 2D cursor position and on the vanishing point.

In yet another embodiment, 2D cursor coordinates are mapped onto a guiding plane in 3D space by finding first and second lines that lie within the guiding plane and determining a vanishing point for each of the lines. A horizon line for the guiding plane is constructed by connecting the vanishing points for the first and second lines. A mapped position on the guiding plane is chosen based on the 2D cursor position and on the constructed horizon line. The first and second lines may be such that they are not parallel to the view plane and such that they are not parallel to each other.

In a still further embodiment, a sequence of 2D positions of a displayed cursor is mapped onto a sequence of positions along a guiding element that lies within a displayed virtual 3D space by selectively applying one or the other of two different mapping strategies to different ones of the 2D positions.

Advantages of the invention may include one or more of the following: 3D objects are made to move in a manner more consistent with the user's intent; discontinuous and/or erratic movements of 3D objects are prevented; 3D objects are ensured to remain far enough from a horizon line or vanishing point such that they are not rendered effectively invisible and/or irretrievable; the maximum distance from the eye point at which a 3D object is placed may be varied based on user skill and differing application objectives; 3D objects are ensured to be placed no closer to the eye point than the near clipping plane; discontinuities along a guiding line or a guiding plane, such as vanishing points or horizon lines, are easily located; and every position on a screen display is ensured to have a continuous mapping position on a guiding line or plane.

Other advantages and features will become apparent from the following description and claims.

DESCRIPTION

FIG. 1 is a computer system displaying a 3D image.

FIGS. 2(a) and 2(b) are perspective views of an object moving along a line.

FIGS. 3(a) and 3(b) are perspective views of an object moving along a plane.

FIGS. 4(a)–4(c) are three views of a 3D line.

FIG. 5 is a system block diagram.

FIGS. 6(a)–6(c) are exemplary screen displays showing a guiding line.

Figure 10A:
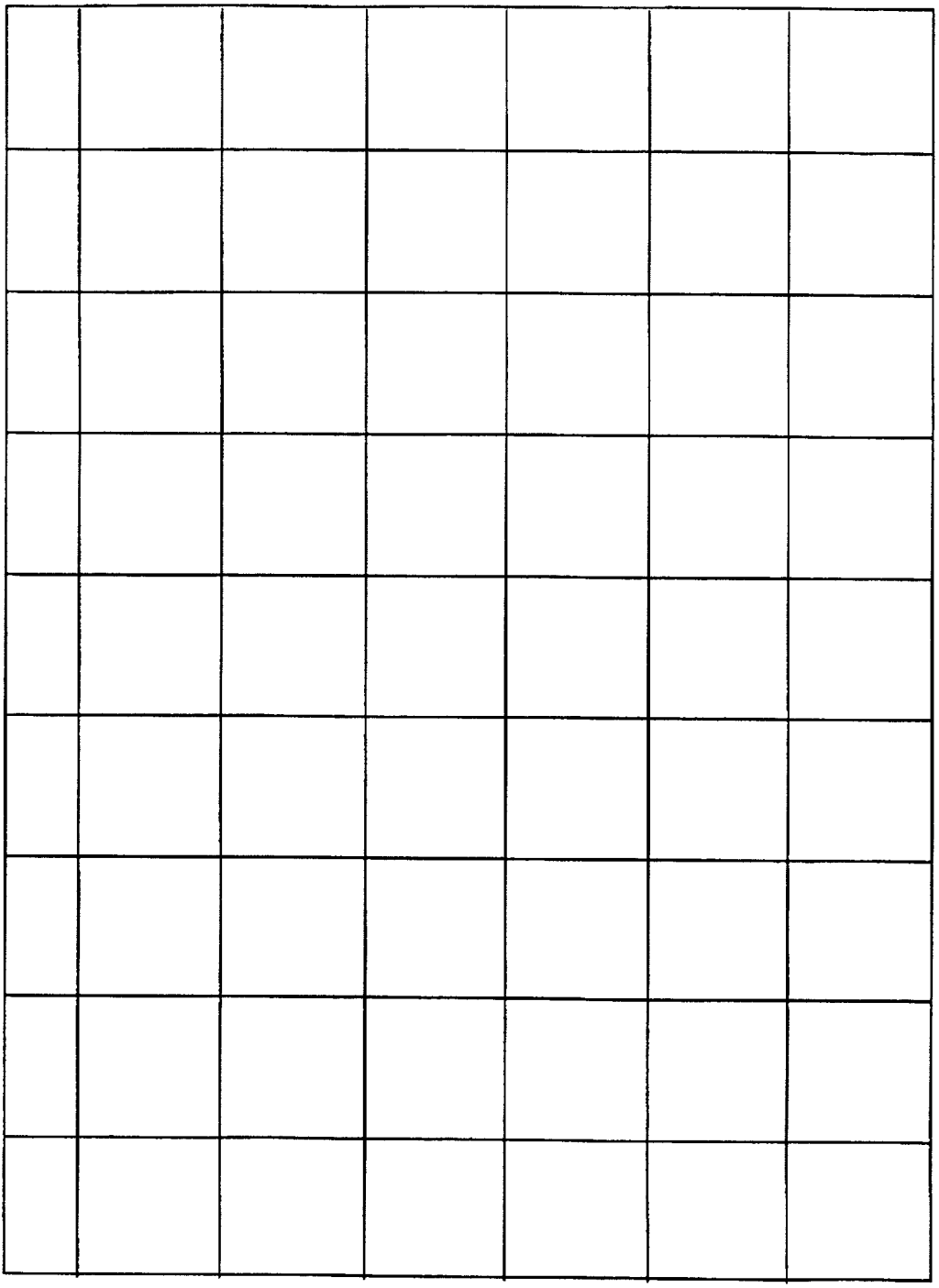
Figure 10C:
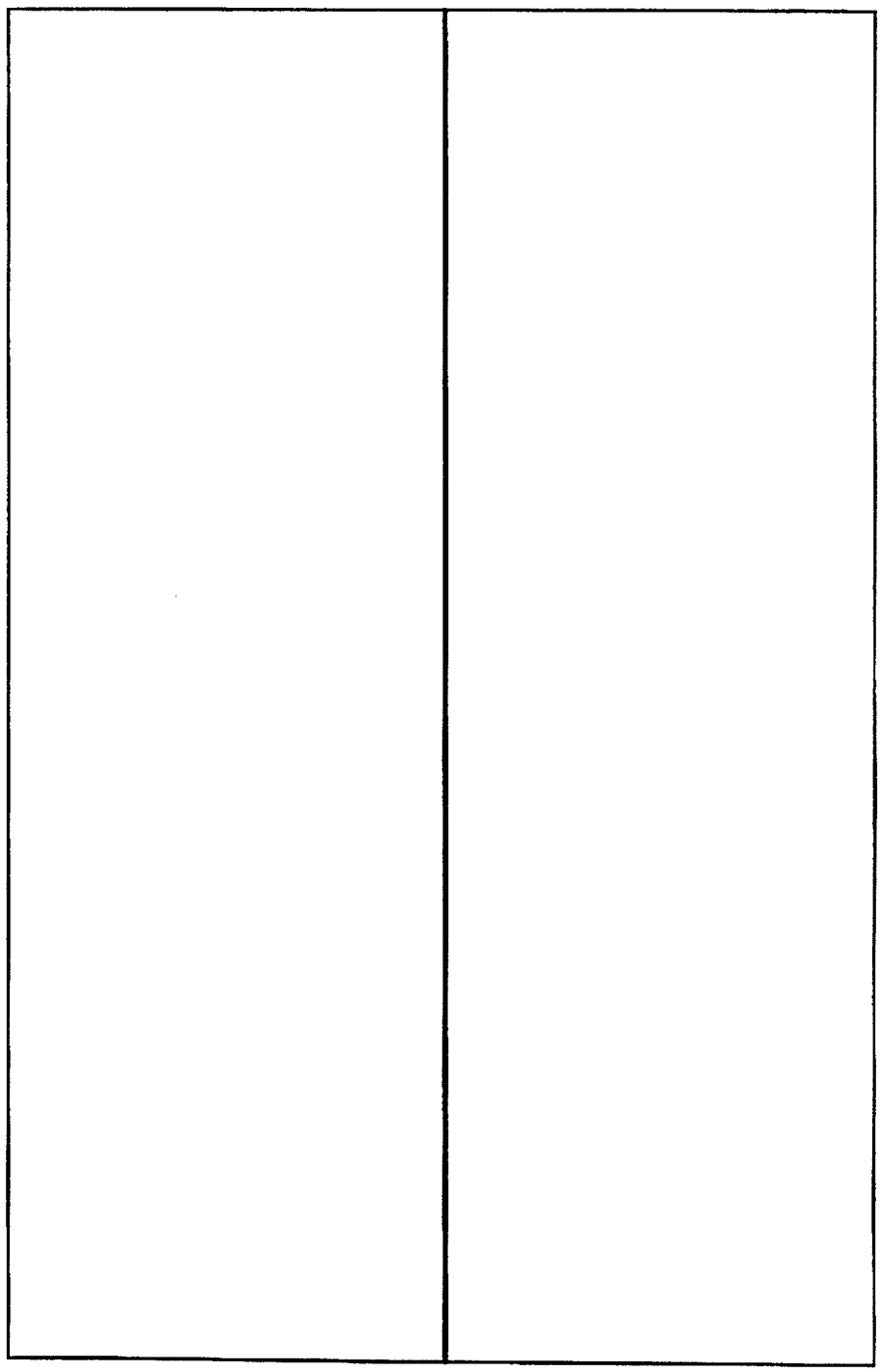

FIG. 10(a)–10(c) are three views of a 3D plane.

Figure 11:
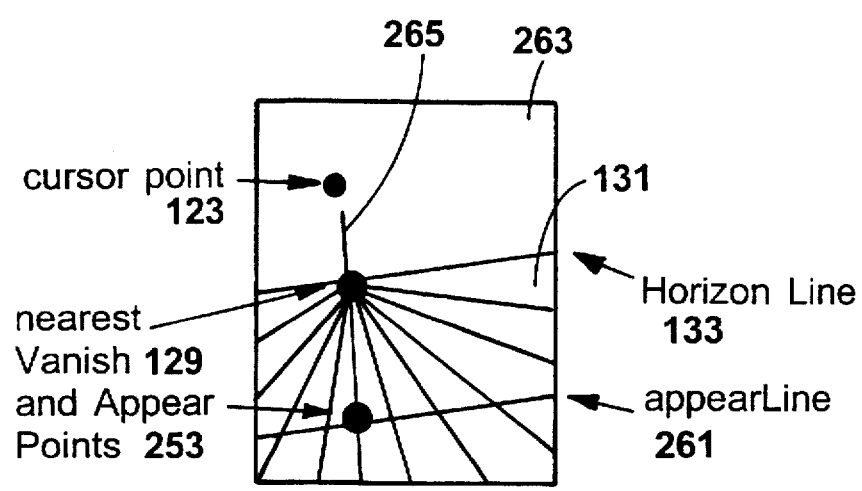

FIG. 11 is an exemplary screen display showing a guiding plane.

Figure 12A:
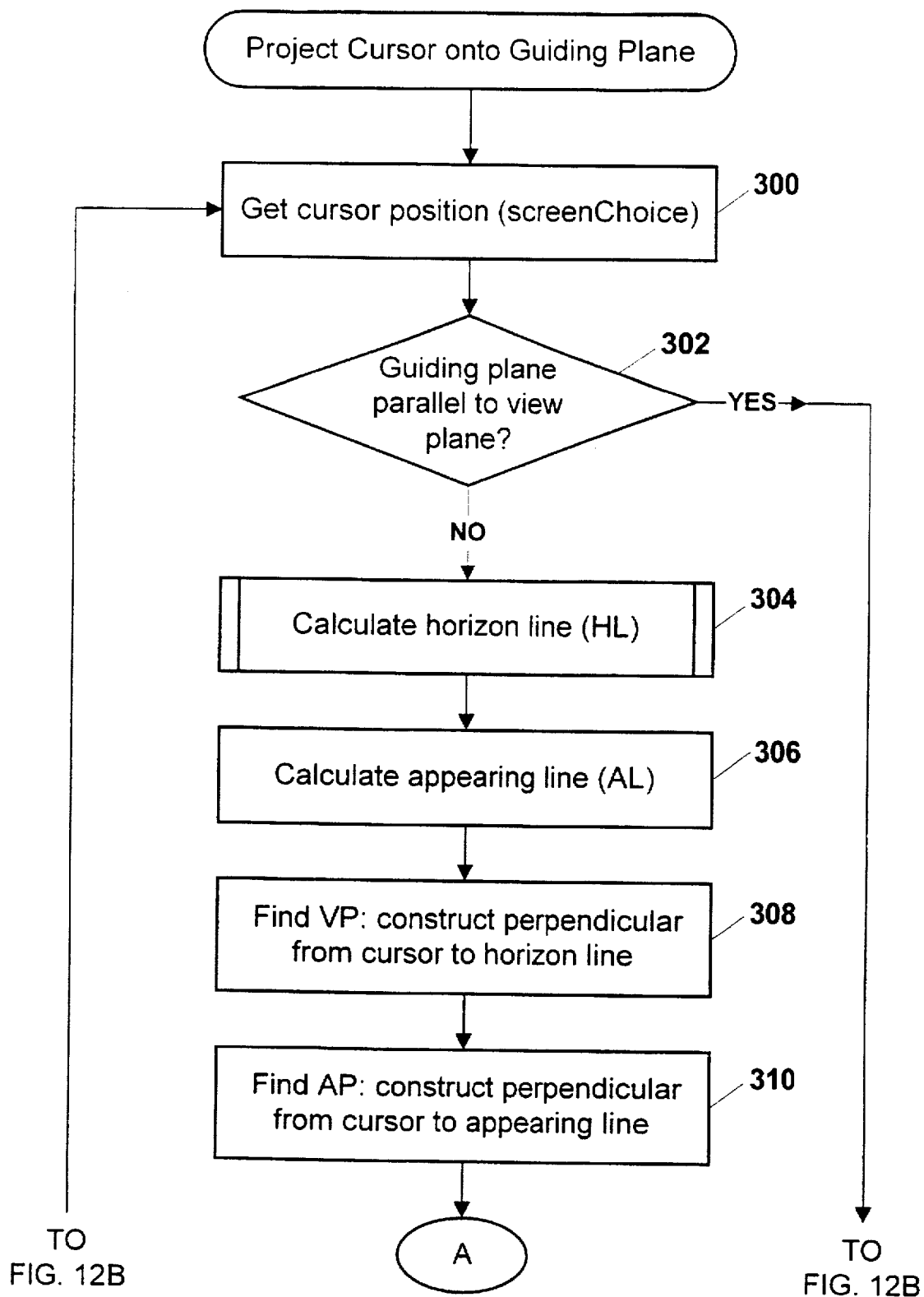
Figure 12B:
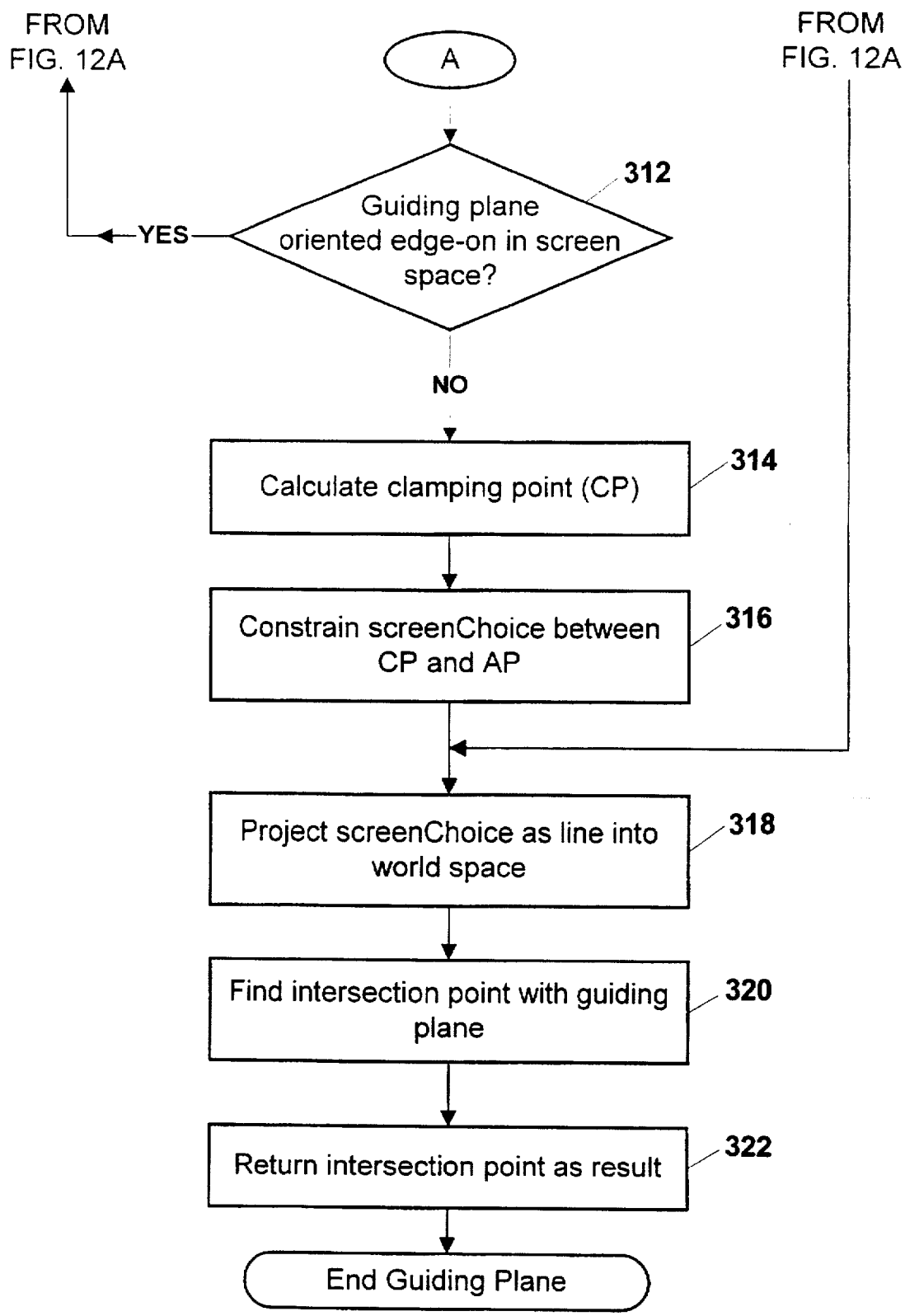

FIG. 12 is a flowchart of projecting a cursor onto a plane.

Figure 13:
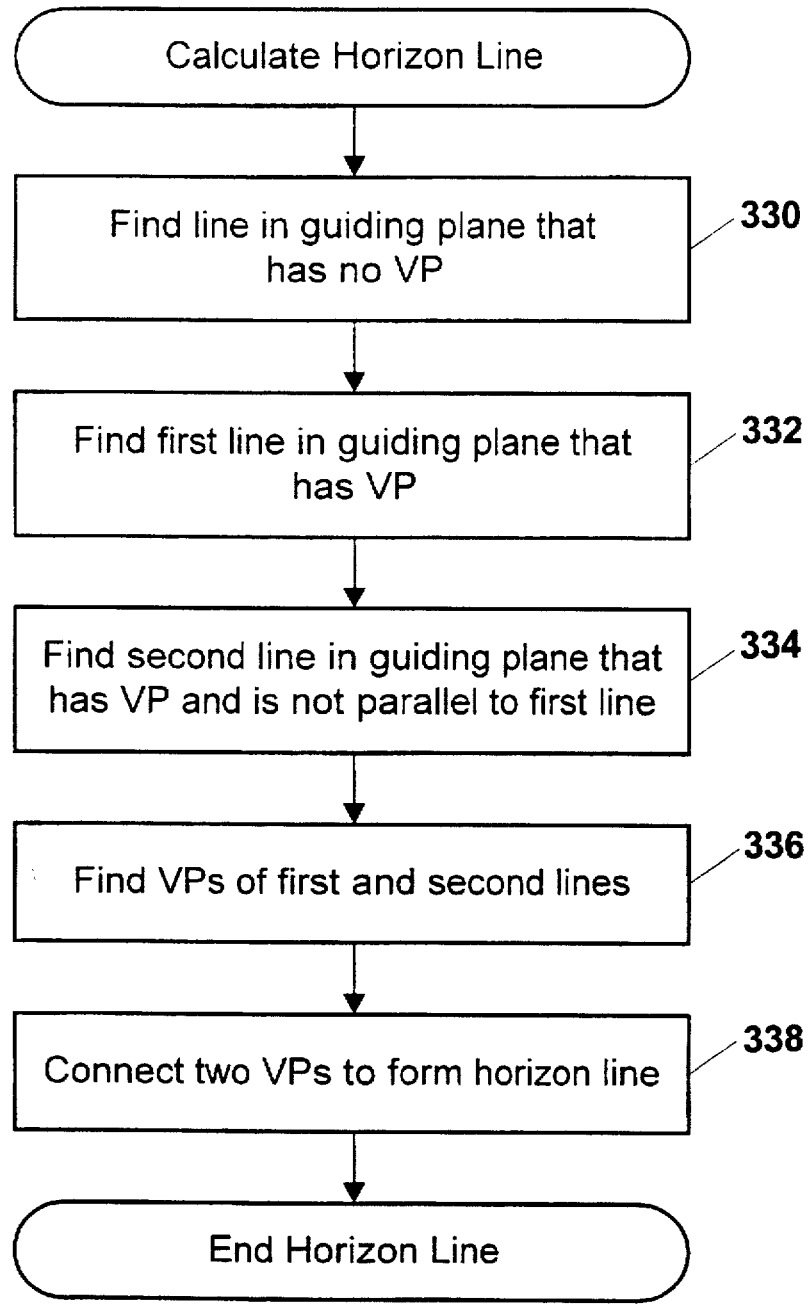

FIG. 13 is a flowchart of calculating a horizon line.

Figure 14:
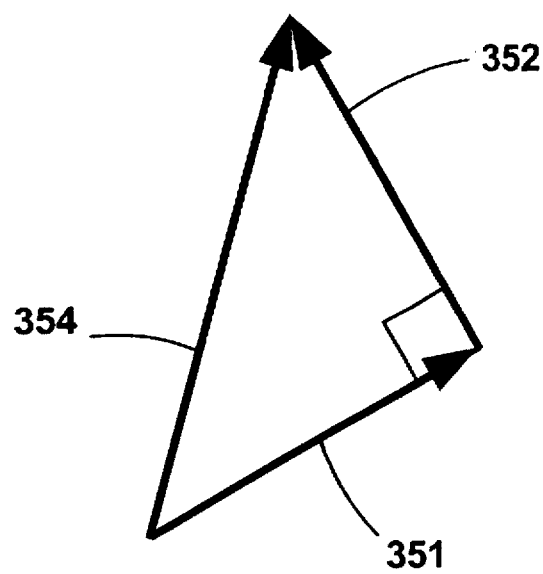

FIG. 14 is a vector diagram.

Figure 1:
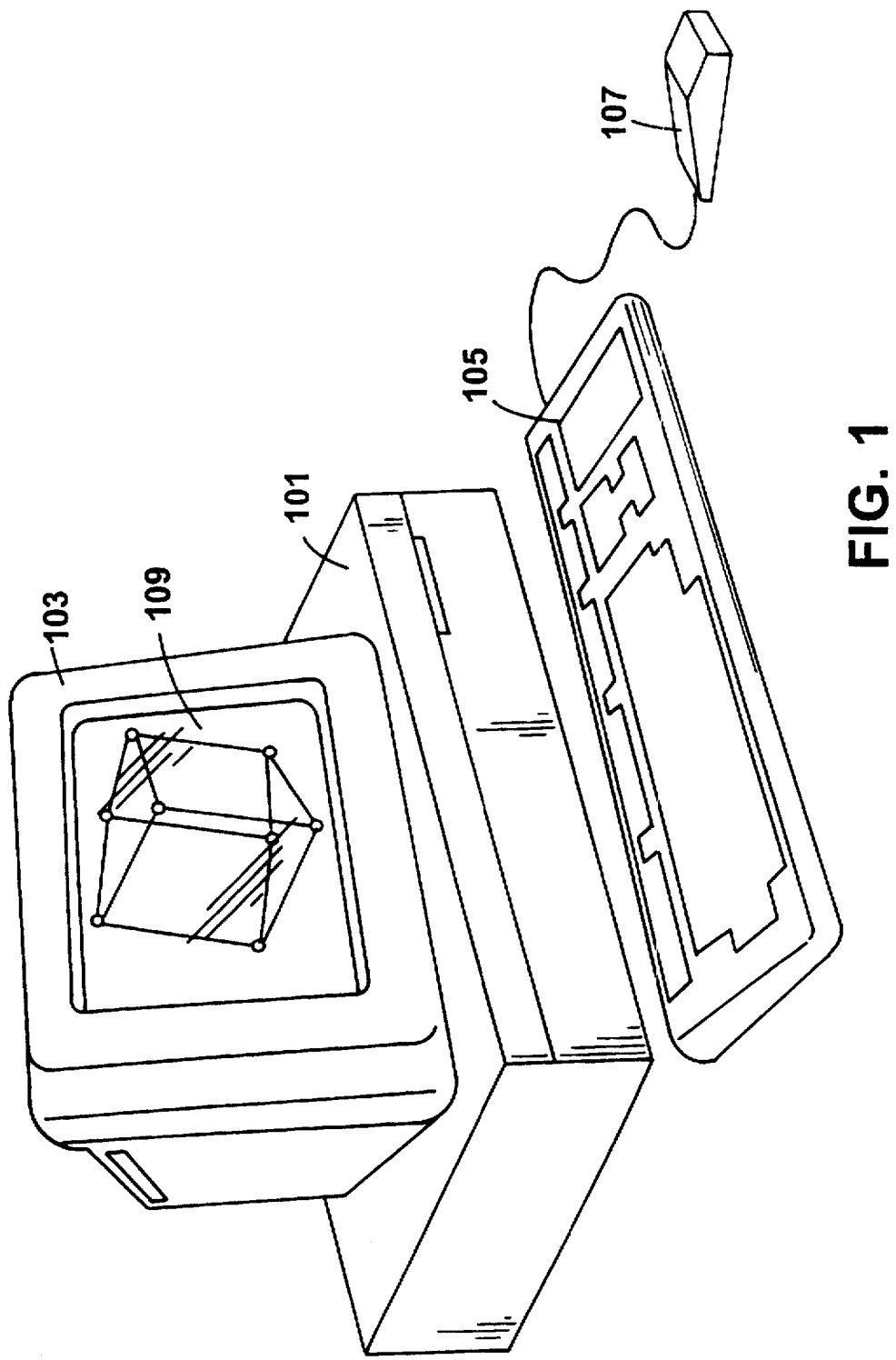

The computer system illustrated in FIG. 1—including cursor control device 107, keyboard 105, CPU 101 and CRT 103—represents a typical hardware setup for running software that allows a user to view and manipulate a widget 109 rendered as a 3D object. The techniques described here apply to any computer system which has a display device such as CRT 103 and a cursor control device 107 such as a mouse.

The techniques described here were implemented on Silicon Graphics machines using the Open Inventor toolkit, Motif, OpenGL, and the C++ programming language.

The manner in which a user operates a multi-part widget (or set of widgets) on the screen display is modeled by four phases: (1) approaching, (2) clicking, (3) dragging, and (4) releasing.

In the approaching phase, the user explores the scene with the cursor. As the cursor passes over selectable parts of the object, they react in a way that is consistent across the application, for example, by locate highlighting.

In the clicking phase, the user touches a highlighted piece of the widget and clicks, for example, a mouse button. As the various different parts of the widget are touched, new feedback may emerge which conveys the function of each part and which suggests possible directions for mouse motion.

If the user holds the mouse button down and moves the cursor before releasing, then this cursor motion constitutes the dragging phase. During the dragging phase, cursor motion causes a translation, scaling, rotation or other response of the widget in a manner expected by the user. The function performed depends on which part of the widget was clicked. While dragging, the widget should follow any guiding lines or planes without straying or jumping unexpectedly. Objects moving along lines progress toward the vanishing point but may not travel past it. Objects moving in a plane may approach, but not pass beyond, the horizon line for that plane. In either case, no object may translate so far away that it becomes too small to select again. When the cursor strays from the guiding feedback for the line or plane, the motion should continue to relate to the cursor's position on screen.

Coherent interaction may be provided during the dragging phase through the use of algorithms that provide a robust mapping of 2D gestures into 3D motion along a line or a plane. Robust in this context means that certain degenerate cases are avoided by insuring that user input has a well-defined effect on the motion for all cursor locations in the view plane. This is accomplished by calculating and taking into account the existence and locations of vanishing points and horizon lines. Failure to consider vanishing points and horizon lines causes errors in projecting onto lines and planes. These errors can cause discontinuous motion when dragging widgets or 3D objects.

Figure 2A:
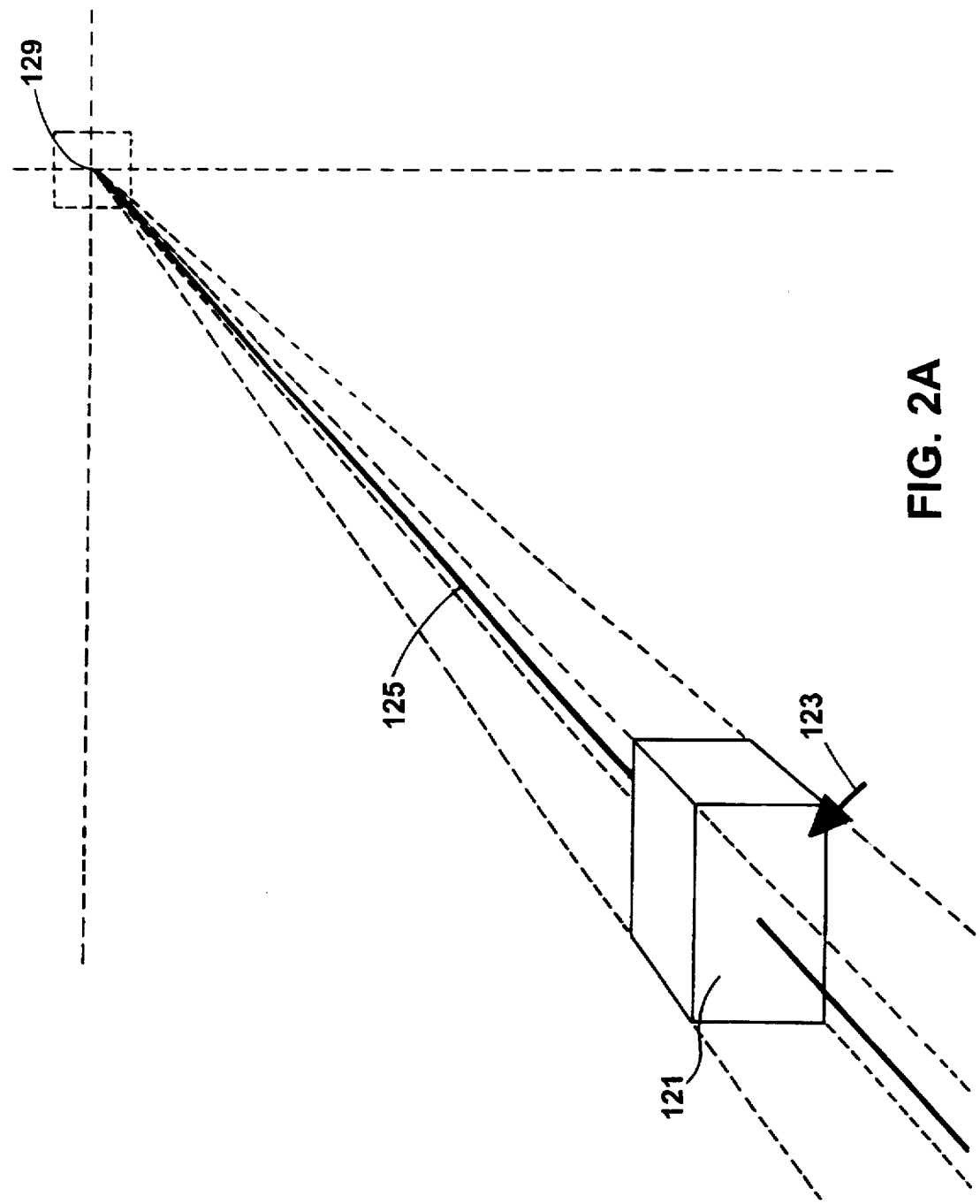
Figure 2B:
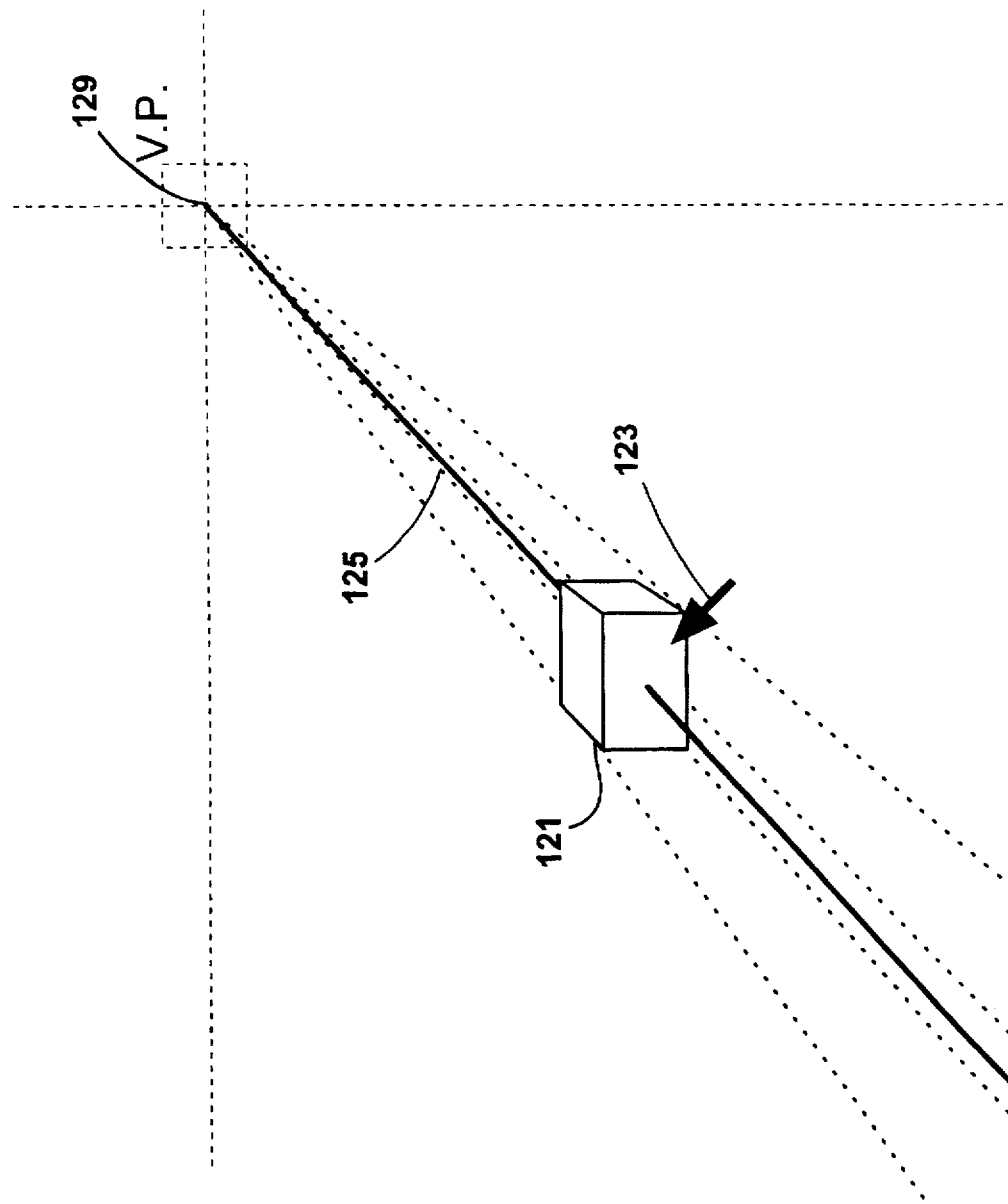

FIGS. 2(a) and 2(b) illustrate a typical situation in which a user manipulates a cursor 123 to move a 3D object 121 along a guiding line 125. When the user touches and then drags object 121, he expects object 121 to move in agreement with the motion of cursor 123—in this case, along guiding line 125 from a position farther away from a vanishing point 129 to a position closer to vanishing point 129. An object displayed in a perspective view, such as in FIG. 2(b), will become smaller as it approaches vanishing point 129. If object 121 is moved too close to vanishing point 129, it will be displayed as a single dot on the screen, effectively vanishing from the user's view.

Figure 3A:
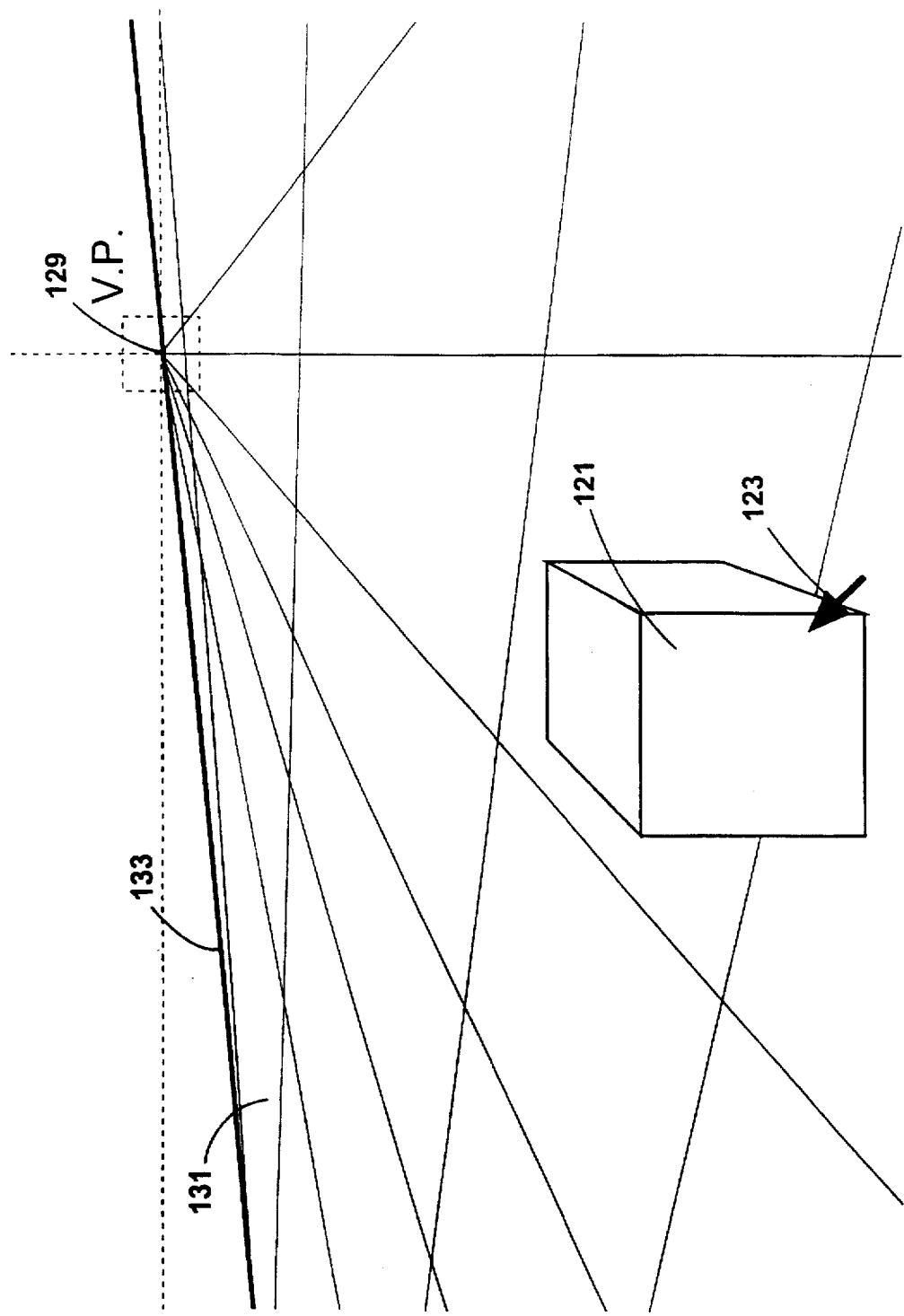
Figure 3B:
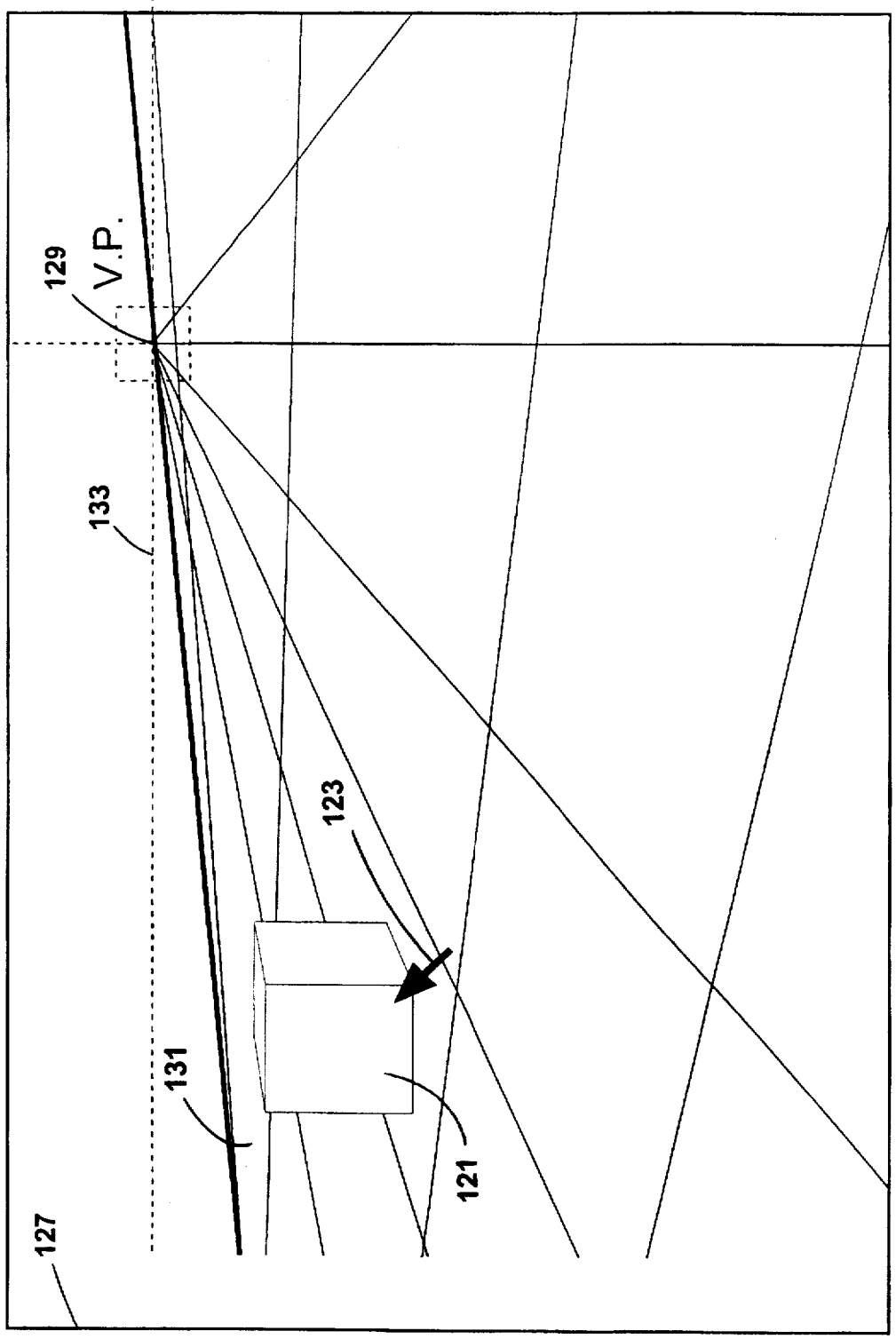

FIGS. 3(a) and 3(b) show an analogous situation in which the user manipulates cursor 123 to move object 121 between different positions on a guiding plane 131. In the perspective views of FIGS. 3(a) and 3(b), object 121 becomes progressively smaller as it is moved closer to a horizon line 133, eventually disappearing from the user's view if it reaches a position too near horizon line 133.

In a 3D perspective view, not all screen locations have a natural mapping position on the guiding line or plane. In FIGS. 3(a)–3(b), for example, if the user moves cursor 123 to a position above horizon line 133, object 121 might move to a position that is totally unexpected and unintended by the user. In conventional systems, object 121 often jumps abruptly to an unanticipated screen location or, in some cases, disappears altogether when cursor 123 is moved to certain locations on the screen.

Similarly in FIGS. 2(a) and 2(b), discontinuous motion of object 121 may result if the user moves cursor 123 to a location that is beyond vanishing point 129. Accordingly, to prevent discontinuous or unexpected movement of a 3D object first, the screen regions that cause erratic behavior must be identified, and second, predictable behavior for the 3D object must be specified when the cursor moves through those screen regions.

GUIDING LINE

The situation in which a user moves a 3D object along a guiding line is now explained in more detail. A line displayed on a CRT as existing in 3D space falls into one of the three categories depicted in FIGS. 4(a), 4(b) and 4(c).

Figure 4A:
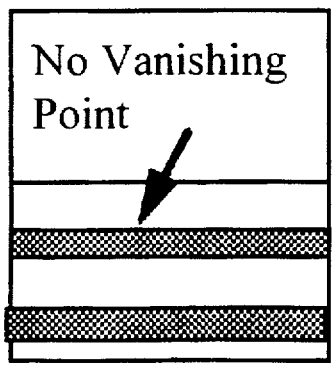

In case [A] (FIG. 4(a)), the guiding line is parallel to the view plane and thus does not have a vanishing point.

Figure 4B:
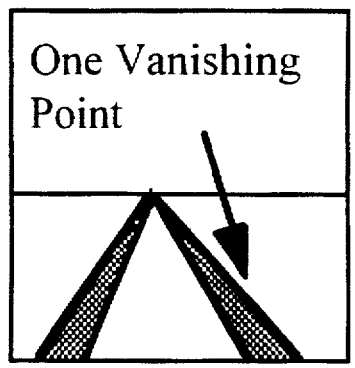
Figure 4C:
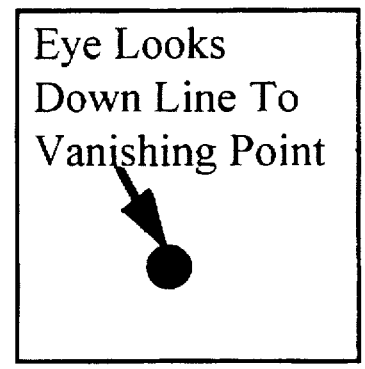

In case [C] (FIG. 4(c)), the guiding line is perpendicular to the view plane. As a result, the eye looks straight down the guiding line which appears as a single point on the screen.

In case |B| (FIG. 4(b)), the guiding line is neither parallel nor perpendicular to the view plane and thus has a visible dimension terminating at a vanishing point.

Because lines are thin, most screen locations do not fall directly on a given guiding line. Consequently, when a user seeks to move a 3D object along a guiding line by positioning the cursor at a desired location on the screen, it is unlikely that the cursor will fall exactly on the guiding line. Thus, it is necessary for the system to map the cursor location to the guiding line according to certain assumptions about what the user may have intended. In a typical approach, the position along the guiding line at which the object is to be placed, therefore, is determined by finding the position on the guiding line that is "closest" to the cursor position, thus mapping the cursor position to the guiding line position. However, the exact position at which the object is placed along the guiding line varies with the manner in which this "closest" point is calculated.

One way to find the "closest" point is to project the cursor location into world space as a line that passes through both the eye and the cursor's world space location and then to calculate, in world space, the point on the guiding line that is closest to the newly constructed cursor line. Because this technique ignores the fact that the guiding line may have a vanishing point, however, it may cause the object to move in an unexpected fashion.

Figure 5:
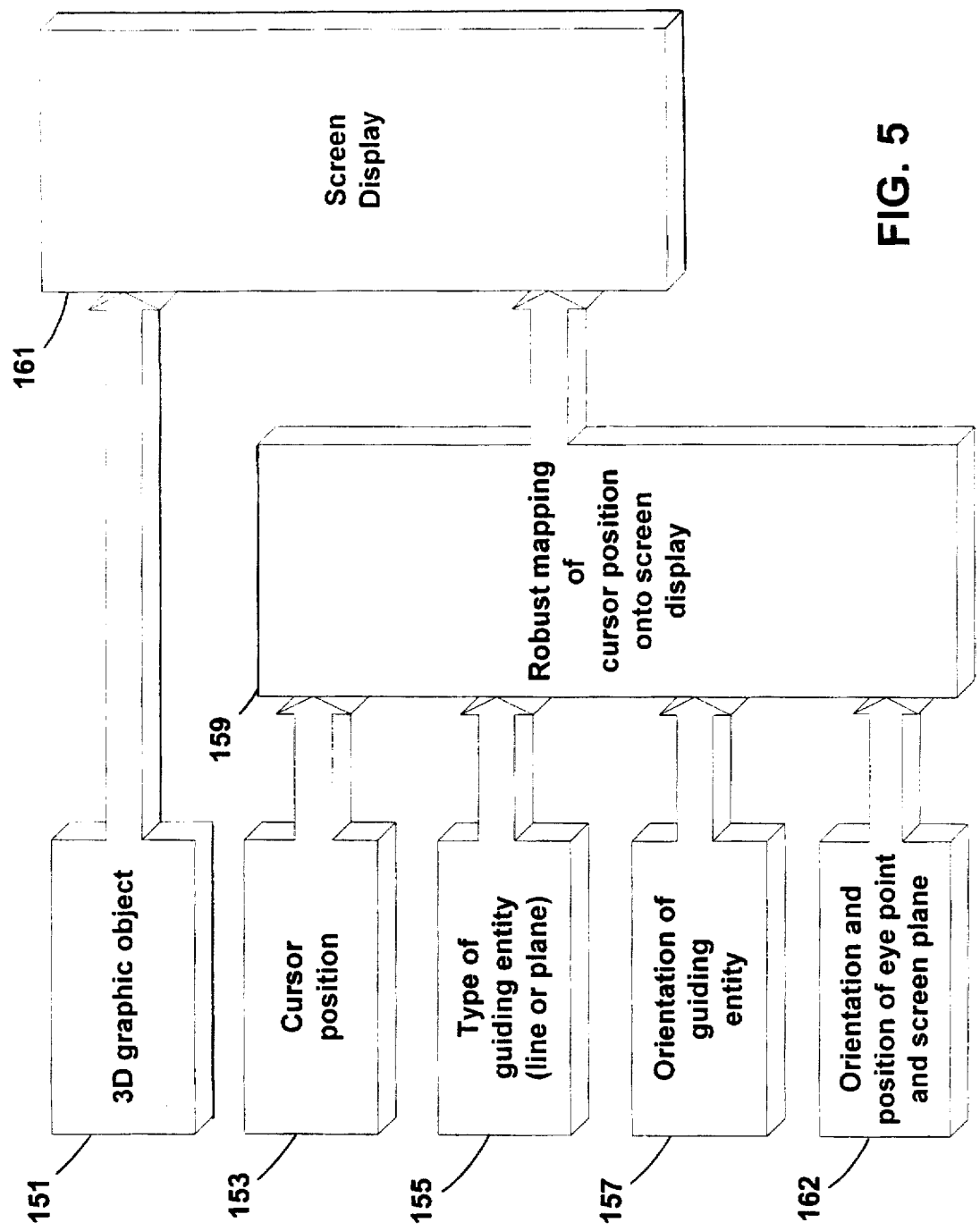

FIG. 5 illustrates a model for projecting a cursor position onto a guiding entity (either a line or a plane) that prevents discontinuous or unexpected motions from occurring. The model of FIG. 5 uses other parameters in addition to cursor position 153 in determining where to place 3D object 151 on screen display 161. These other parameters include the type of guiding entity 155 (e.g., line or plane), the orientation of that entity 157 (e.g., one of the three orientations illustrated in FIGS. 4(a)–4(c)), and the position and orientation of the eye point and screen plane 162 relative to world space. The algorithm represented by block 159 uses these four parameters as inputs to determine a location for placement of object 151 on screen display 161 that is less likely to astonish a user. The particular placement location selected will be such that object 151 appears to move in a continuous fashion and such that it will not disappear from view, for example, due to its being placed too close to a vanishing point or horizon line.

Figure 6A:
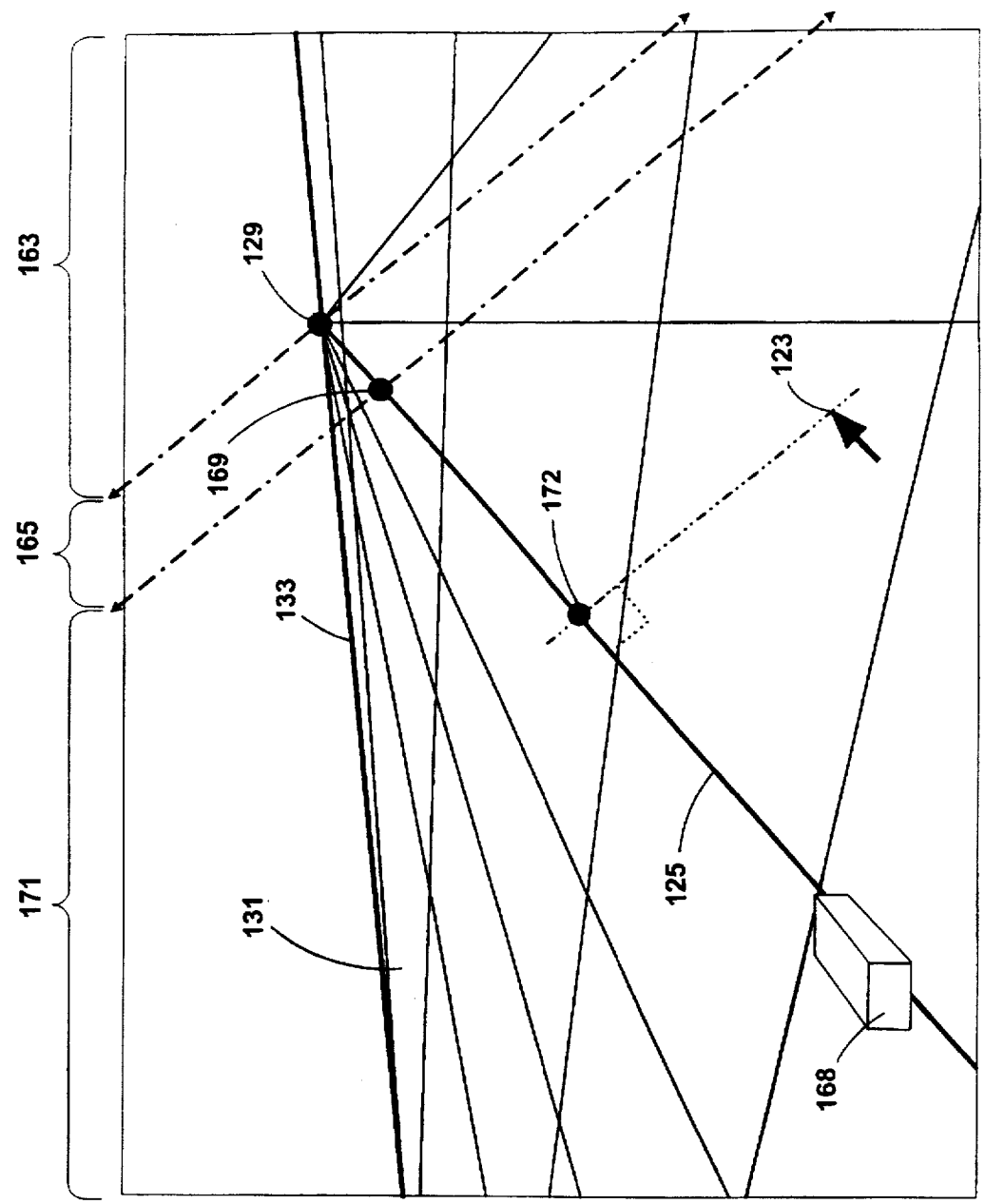
Figure 6B:
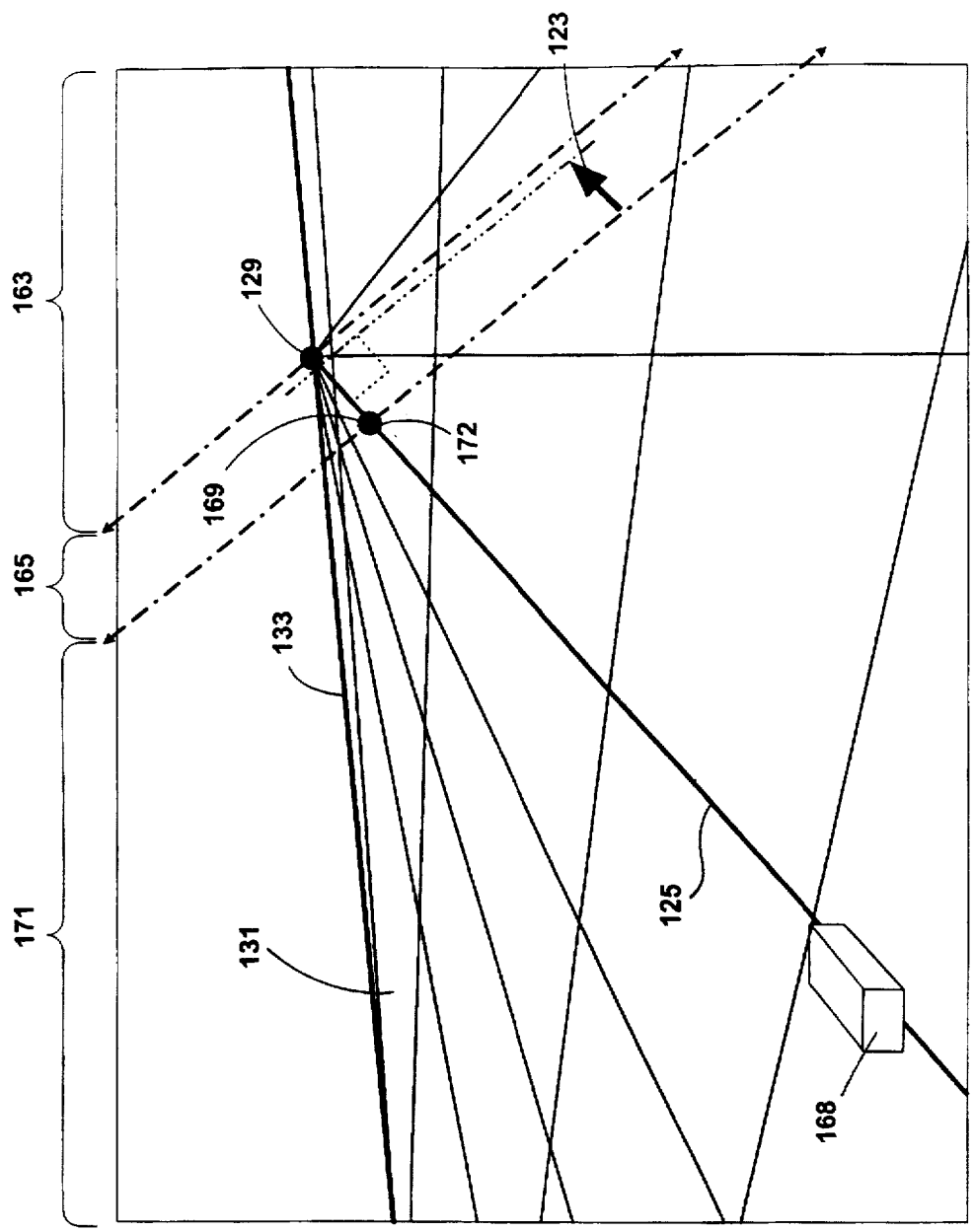
Figure 6C:
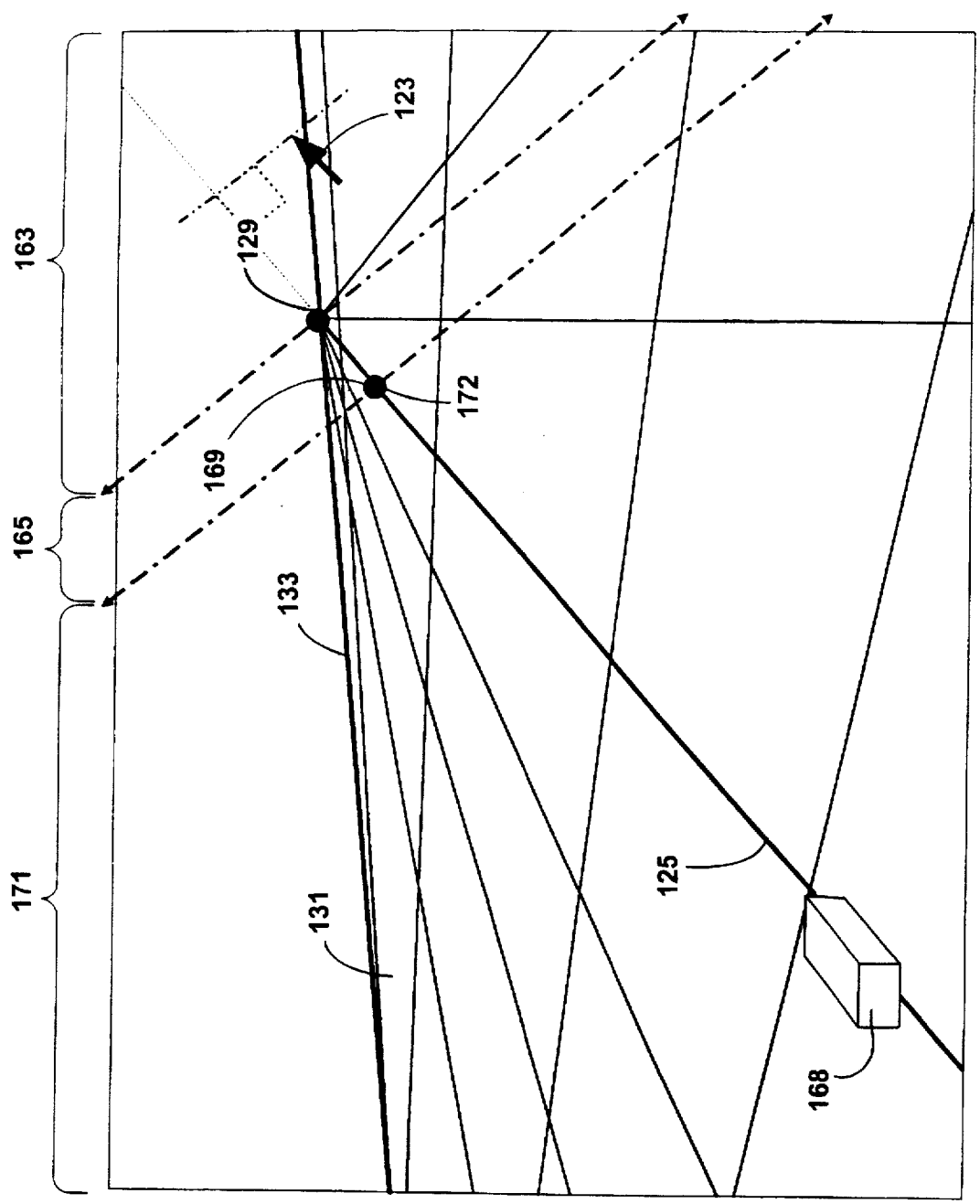

FIGS. 6(a)–6(c) provide a graphic illustration of how this robust mapping is achieved when the motion of an object 168 is constrained to points along a guiding line 125. The scene in each of FIGS. 6(a)–6(c) is divided logically into three regions—163, 165 and 171—each of which has a different mapping solution.

In FIG. 6(a), the corresponding point on guiding line 125 at which the object 168 is to be placed is determined by finding the point on guiding line 125 that is closest in screen space to the cursor position 123. By definition, this closest screen space point is the point on guiding line 125 from which a perpendicular line may be drawn to the cursor position. In FIG. 6(a), therefore, the object's screen space placement point 172 is determined by constructing a perpendicular line from cursor position 123 to guiding line 125. Because screen space placement point 172 falls within region 171, it need not be modified, and thus may be transformed back into world coordinates to arrive at the world space placement point.

Region 165 poses a slightly different situation due to the fact that points on guiding line 125 within region 165 are in proximity to horizon line 133, and thus very distant from the eye. An object placed on guiding line 125 in this region could appear infinitesimally small. Potentially, the object could appear so small that it would not have enough visible surface area on which a user could point, click, and drag the object back closer to the eye, thus rendering the object irretrievable and useless.

This anomaly may be prevented by using a clamped vanishing point 169, defined as the point along guiding line 125 beyond which an object appears too small to be useful. Objects placed at clamped vanishing point 169 or closer to the eye remain usefully visible. In FIG. 6(b), therefore, the object's screen space placement point 172 is always mapped to clamped vanishing point 169 when cursor position 123 is in region 165.

The choice of location of the clamped vanishing point 169 is largely a matter of design choice that may be determined through trial and error, and which will vary with application types, user preferences, and user skill. The closer the clamped vanishing point is to the real vanishing point, the farther away objects may be moved and the smaller they may appear. So if, for example, a particular 3D application is designed to be used by a fine artist or trained technician, it makes sense to provide the user with more control over how close an object may be placed to the vanishing point. In this case, the clamped vanishing point is placed nearer to the vanishing point. On the other hand, if a particular 3D application is designed to be used by a person (e.g., a small child) of less hand-eye coordination than a skilled user, then objects can be given a larger minimum size; the clamped vanishing point should be proportionately closer to the eye so that the user cannot place objects as far away and so that the objects will remain accessible even at their minimum size.

Cursor positions must also be adjusted if, when dropped as a perpendicular onto the guiding line in screen space, they yield a point on the other side of the vanishing point. As shown in FIG. 6(c), therefore, when cursor position 123 is in region 163, screen space placement point 172 is always mapped to clamped vanishing point 169.

What follows in Table I is pseudocode for a routine—projectToLine( )—that implements the mapping scheme represented by FIGS. 6(a)–6(c).

TABLE I

```
boolean projectToLine(worldLine, cursor, &result)
{
    // Does line pass through eye? (case [C])
    testPt = closestToPoint( worldLine, worldEyePoint )
    if ( testPt == worldEyePoint)
        return FALSE;
    // Find screen mapping, disregarding vanishing pt.
    screenLine = getScreenSpaceLine( worldLine );
    screenChoice = closestToPoint(screenLine, cursor);
    hasVanish = getVanishingPoint( worldLine, vanish);
    if ( hasVanish ) {
        // One vanishing point (case [B] ).
        // Get clamped vanishing point.
        getAppearingPoint( worldLine, appear );
        clamp = interp( vanish, appear,
                VANISH_FACTOR );
        // Constrain our choice to lie between appear
        // and clamp.
        constrainBetween(appear, clamp, screenChoice);
    }
    else {
        // No vanish point (case [A] ). Needn't
        // constrain.
    }
    // Project screen choice into world space and
```

TABLE I-continued

```
//intersect with worldLine.
choiceWorldLine
    = getWorldSpaceLine( screenChoice );
result = closestToLine(worldLine, choiceWorldLine);
return TRUE;
}
```

Figure 7:
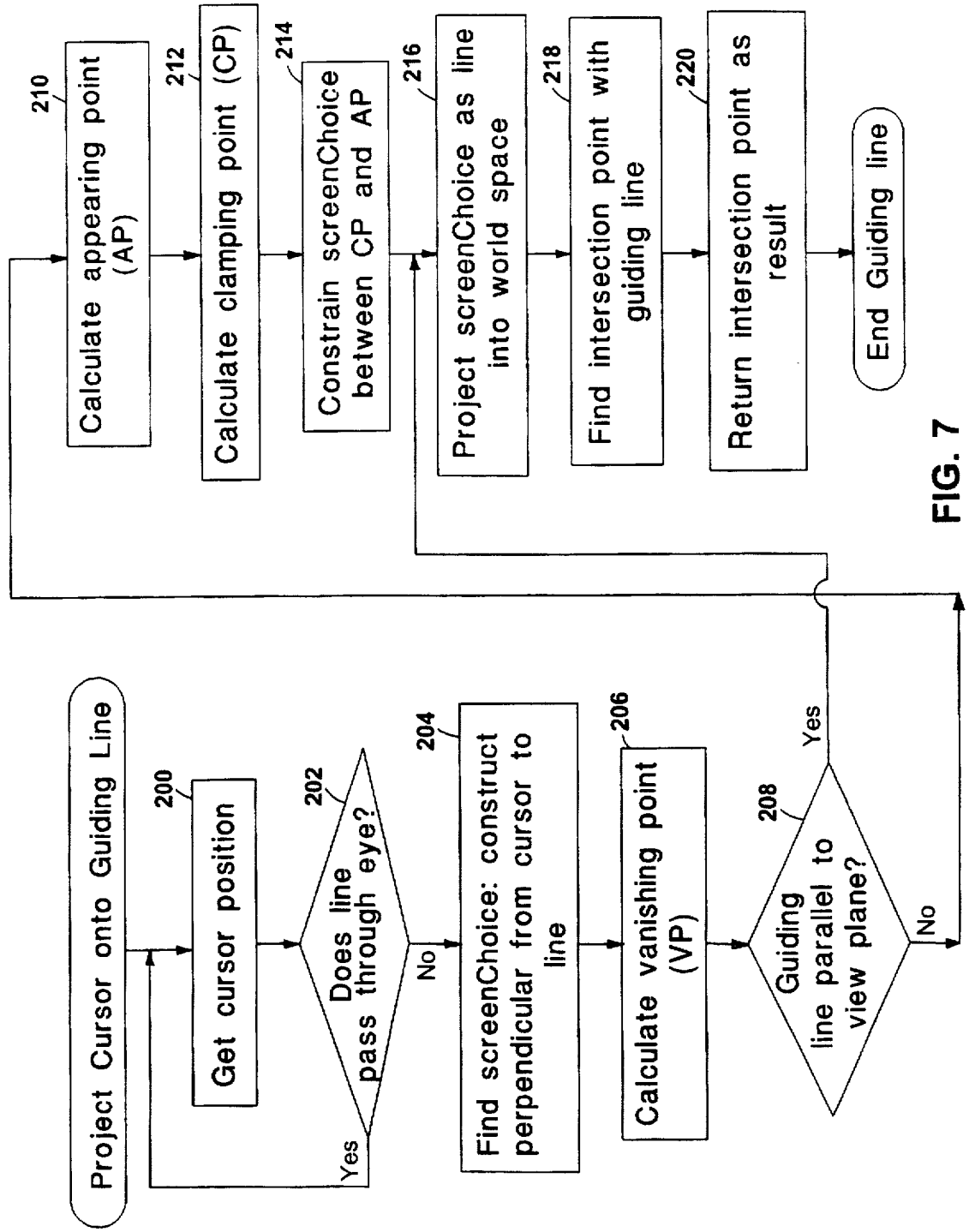
FIG. 7 is a flowchart of projecting a cursor onto a line.

The projectToLine( ) routine receives "worldLine"—a data structure that defines the guiding line in world space and "cursor"—the cursor position in screen coordinates—as inputs. projectToLine( ) returns FALSE if the guiding line passes through the eye (case [C] in FIG. 4(c)), because in that case the entire guiding line maps to a single point on the screen and meaningful dragging is impossible. If the guiding line falls either in case [A] (FIG. 4(a)) or case [B] (FIG. 4(b)), projectToLine( ) returns "result," a world space point on the guiding line representing the placement point for the object. The logic underlying the projectToLine( ) routine is illustrated by the flowchart of FIG. 7.

After the cursor position has been obtained in step 200, projectToLine( ) determines in step 202 whether the guiding line falls into case [C] (i.e., passes through the eye). This is determined by calling the closestToPoint( ) routine to find the point on worldLine (the guiding line in world space) that is closest to worldEyePoint (the world eye point). The world eye point is located at an arbitrary set of coordinates that were selected at the time the image was generated.

If the point determined by closestToPoint( )—testPt—is the same as the world eye point, it means that the guiding line passes through the eye. Since meaningful dragging of the object is impossible in that case, the routine terminates and waits for the next new cursor position.

If testPt is any point other than the world eye point, it means that the guiding line falls either into case [A] or into case [B], in which cases meaningful dragging of the object is possible, and the routine proceeds to step 204. In this step, projectToLine( ) determines the point on the guiding line that is closest in screen space to the cursor position. To achieve this, the guiding line is first transformed from world space (worldLine) to screen space using getScreenSpaceLine( ) and the result is stored in "screenLine"—a data structure that defines the guiding line in screen space. Once the guiding line has been mapped into screen space, closestToPoint( ) is invoked again to find the point along screenLine that is closest to the cursor position and the answer is returned in "screenchoice"—a point in screen space. By well-known geometric proofs, the fact that screenchoice is the closest point on screenLine to the cursor means that screenchoice is the point along screenLine at which a perpendicular line can be drawn to the cursor position.

Up to this point, the possible existence and effect of a vanishing point has been ignored. If the guiding line falls into case [A] (the guiding line is parallel to the view plane), it has no vanishing point and no danger exists that the object will move along the guiding line in an erratic or discontinuous fashion. If, however, the guiding line falls into case [B], consideration of the existence and location of the vanishing point is necessary so that screenchoice may be adjusted as appropriate if it points to a screen location that would result in discontinuous or erratic movement of the object (i.e., if screenchoice is in regions 163 or 165 in FIGS. 6(a)–6(c)).

Accordingly, at step 206 the routine getVanishingPoint( ) is called to find the location of the guiding line's vanishing point, if one exists. getVanishingPoint( ) receives a world space line as input and returns "vanish"—the screen space vanishing point for the input line. If the input line has no vanishing point, meaning that the input line is parallel to the view plane (case [A]), getVanishingPoint( ) returns FALSE. The pseudocode for the getVanishingPoint( ) routine is set forth in the following Table II.

TABLE II

```
boolean getVanishingPoint(line, &vanish)
{
    // Get direction of line in affine space
    affPt1 = line.pt1 * affineMatrix;
    affPt2 = line.pt2 * affineMatrix;
    affineLineDir = affPt2 - affPt1;
    normalize( affineLineDir );
    // Is z-direction 0?
    if ( affineLineDir.Z == 0 )
        return FALSE;
    // Transform affineLineDir to screen
    // space to get vanish (explained below)
    vanish = affineLineDir * projMatrix * screenMatrix;
    return TRUE;
}
```

The getvanishingpoint( ) routine relies on three transformation matrices: affineMatrix, projMatrix and screenMatrix.

affineMatrix—This matrix effects a transformation from world space coordinates to affine space coordinates. Affine space is an intermediate state in which all necessary operations have been performed on a world space object other than the perspective distortion transformations. Affine space has two important characteristics—namely, upon transformation from world space into affine space the object is rotated and translated so that (i) the eye point is at (0,0,0); and (ii) the viewing direction is aligned to the negative Z axis (i.e., projecting into the display screen from the user's perspective).

projMatrix—This matrix effects a translation from affine space coordinates to projection space coordinates. Projection space is the state in which the perspective distortions have been performed on affine coordinates. This is a non-linear transformation which effectively turns the viewing frustum into a cube so that the perspective view will appear correct to the viewer. Projection space is a normalized (1×1×1) cube.

screenMatrix—This matrix effects a transformation from projection space to screen space and constitutes the final transformation before a point is displayed on the screen. In effect, this transformation matrix drops the Z-axis component out of the data points and fits the data set to the screen resolution, taking into account the aspect ratio of the viewport. By definition, screen space coordinates range from (0, 0, 0) to (pixelwidth, pixelHeight, 0).

The line received by getVanishingPoint( ) is defined as two world space points, line.Pt1 and line.Pt2. These points are transformed into their affine space equivalents—affPt1 and affPt2—by multiplying them by affineMatrix. These two affine space points are used to calculate the affine space direction of the input line—affineLineDir—by subtracting affPt1 from affPt2. Next, affineLineDir is normalized—i.e., it is converted to a vector of length one—consistent with the definition of a direction.

After affineLineDir is normalized, getVanishingPoint( ) checks to see if the Z-axis component of affLineDir is 0. If so, the line is parallel to the view plane (case [A]) and FALSE is returned indicating that no vanishing point exists for the input line.

If the Z-axis component is not zero, affLineDir is converted to screen space by multiplying it by projMatrix and screenMatrix. The result of the conversion, "vanish," represents the screen space vanishing point for the input line. This convenient outcome is the natural consequence of the following truisms: (i) all parallel world-space lines share the same vanishing point; (ii) two lines having the same direction are parallel; and (iii) every point on a line that passes through the eye point—including that line's vanishing point—maps to a single point in screen space.

Consider two parallel lines, one of which passes through the eye point. The eye looks straight down along this line, so all points along it map to the same point in screen-space. This single screen point is therefore the vanishing point for the line that passes through the eye point and for every line parallel to that line which passes through the eye point. In affine-space, the eye is at (0, 0, 0). The line from (0, 0, 0) to a point located at affineLineDir must be parallel to the input line, but pass through the eye.

Accordingly, once the direction of the input line (affLineDir) is determined, it is used to construct a new line that is parallel to the input line and that passes through the eye point. Such a line is defined as affineLineDir minus (0,0,0), which obviously is just affineLineDir. All that is left to do is to transform affineLineDir back into screen space to find the screen space vanishing point for the input line.

If, at step 208, getVanishingPoint( ) returns FALSE, it means that the guiding line falls into case [A], and no adjustment to screenchoice is necessary. In that case, the flow skips to step 216 where screenchoice is mapped back into world space using getWorldSpaceLine( ), a routine that creates a world space line corresponding to the ray from eye toward the input screen point. The result is stored in choiceWorldLine—a world space line that passes through the eye point and intersects the guiding line at a point that, when projected into screen space, is closest to the cursor position. The closestToLine( ) routine determines the coordinates of this intersection point by finding the point on worldLine (the guiding line) that is closest to choiceWorldLine (the line formed by projecting the cursor position into world space). Since these lines intersect, the result of closestToLine( ), will be, of course, the point at which these two lines intersect. The answer, representing the point in world space at which the 3D object is to be placed, is returned in "result."

Figure 8:
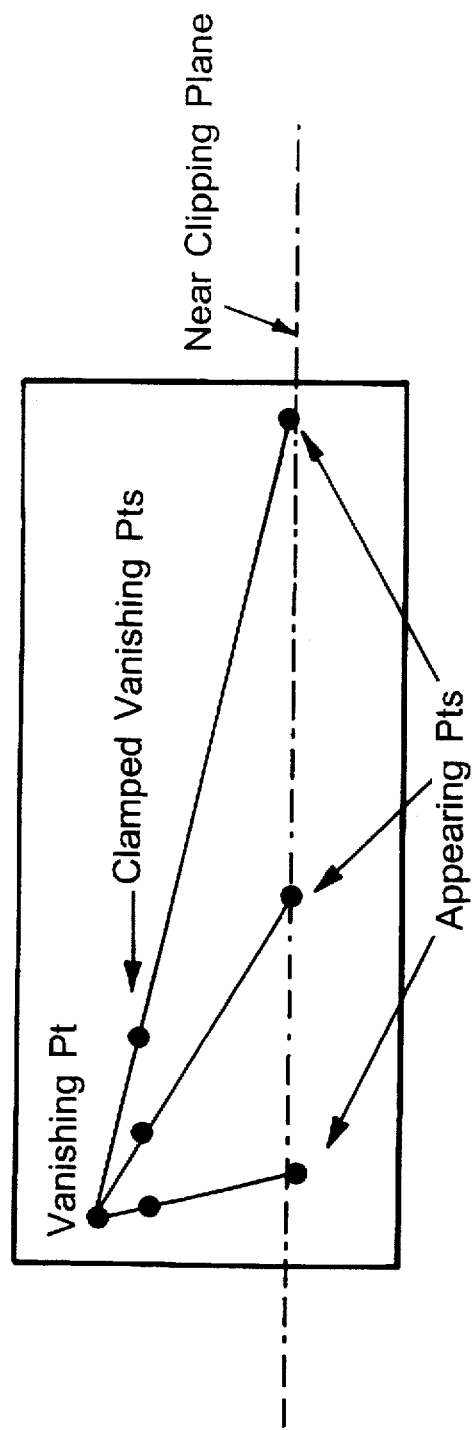
FIG. 8 is a perspective view of three parallel lines.

If, however, it is determined at step 208 that the guiding line is not parallel to the view plane, and thus has a vanishing point, screenchoice may need to be adjusted to prevent the object from moving along the guiding line in an erratic or discontinuous fashion. Whether or not screenchoice needs to be adjusted depends on its position relative to the clamped vanishing point and to the "appearing point" for the guiding line. The appearing point is defined as the point in screen space at which the guiding line intersects the near clipping plane, which in virtually all cases is coplanar with the view plane. An example of three parallel lines and their respective clamped vanishing points and appearing points is shown in FIG. 8.

What follows in Table III is pseudocode for a routine—getAppearingPoint( )—that finds the screen space appearing point for a world space line and returns the result in "appear". This routine assumes that the input line is not parallel to the view plane, so it should not be called if getVanishingPoint( ) has failed on the same line.

TABLE III

```
void getAppearingPoint(line, &appear)
{
    // Transform line into affine space
    affPt1 = line.pt1 * affineMatrix;
    affPt2 = line.pt2 * affineMatrix;
    affLine = makeLine( affPt1, affPt2 );
    // Create the viewPlane in affine space.
    affViewPlane = makePlane( nearViewDist, zAxis );
    // intersect and transform result
    affAppear = intersect( affViewPlane, affLine );
    appear = affAppear * projMatrix * screenMatrix;
}
``` getAppearingPoint( ) receives a world space line as input, transforms the points defining the input line into affine space coordinates (affpt1 and affpt1), and uses those coordinates to construct an affine space line, affLine, by means of the routine makeLine( ). affLine is a data structure that constructs a line given a point and a direction.

Next, getAppearingPoint( ) constructs the view plane in affine space using the makeplane( ) routine. makeplane( ) fills a data structure representative of a plane (affViewPlane) using two inputs that together define a geometric plane: (i) a direction that is perpendicular to the plane that is being defined and (ii) a distance from the eye to the plane along the direction defined in (i) above. The view plane is constructed by using zAxis (the Z-axis) as the defining direction, and nearViewDist (the distance between the eye and the view plane) as the defining distance.

Once the view plane is constructed, the intersect( ) routine is called to find the point of intersection in affine space between the input line (affLine) and the near clipping plane (viewPlane). Finally, the affine space intersection point—affAppear—is transformed to screen space using the projMatrix and screenMatrix transformation matrices, and the screen space appearing point for the input line is stored as "appear."

The clamped vanishing point ("clamp") is then calculated at step 212. This is accomplished by using the interp( ) routine to interpolate between the vanishing point and the appearing point by a predetermined value (VANISH_FACTOR). VANISH_FACTOR cannot be a fixed number of pixels from the vanishing point, however. Depending on the line under consideration, a fixed number of pixels maps to a wide range of distances. Instead, VANISH_FACTOR is a proportional distance from the vanishing point toward the appearing point at which the clamped vanishing point is to be constructed. A VANISH_FACTOR value of 0.01 has been used with acceptable results in various applications.

The clamped vanishing point and the appearing point represent the limits for acceptable 3D object placement along the guiding line. That is, the 3D object must be placed along the guiding line somewhere between the clamped vanishing point and the appearing point, inclusive. Accordingly, once the clamped vanishing point and the appearing point have been calculated, constrainBetween( ) is called at step 214 to ensure that screenChoice falls on the guiding line somewhere within the limits of the appearing point and the clamped vanishing point. constrainBetween( ) receives three collinear points as inputs—the appearing point (appear), the clamped vanishing point (clamp), and screenchoice—and tests whether screenChoice lies between the other two. If not, constrainBetween( ) sets the value of screenChoice to the closer of the appearing point and the clamped vanishing point.

Figure 9:
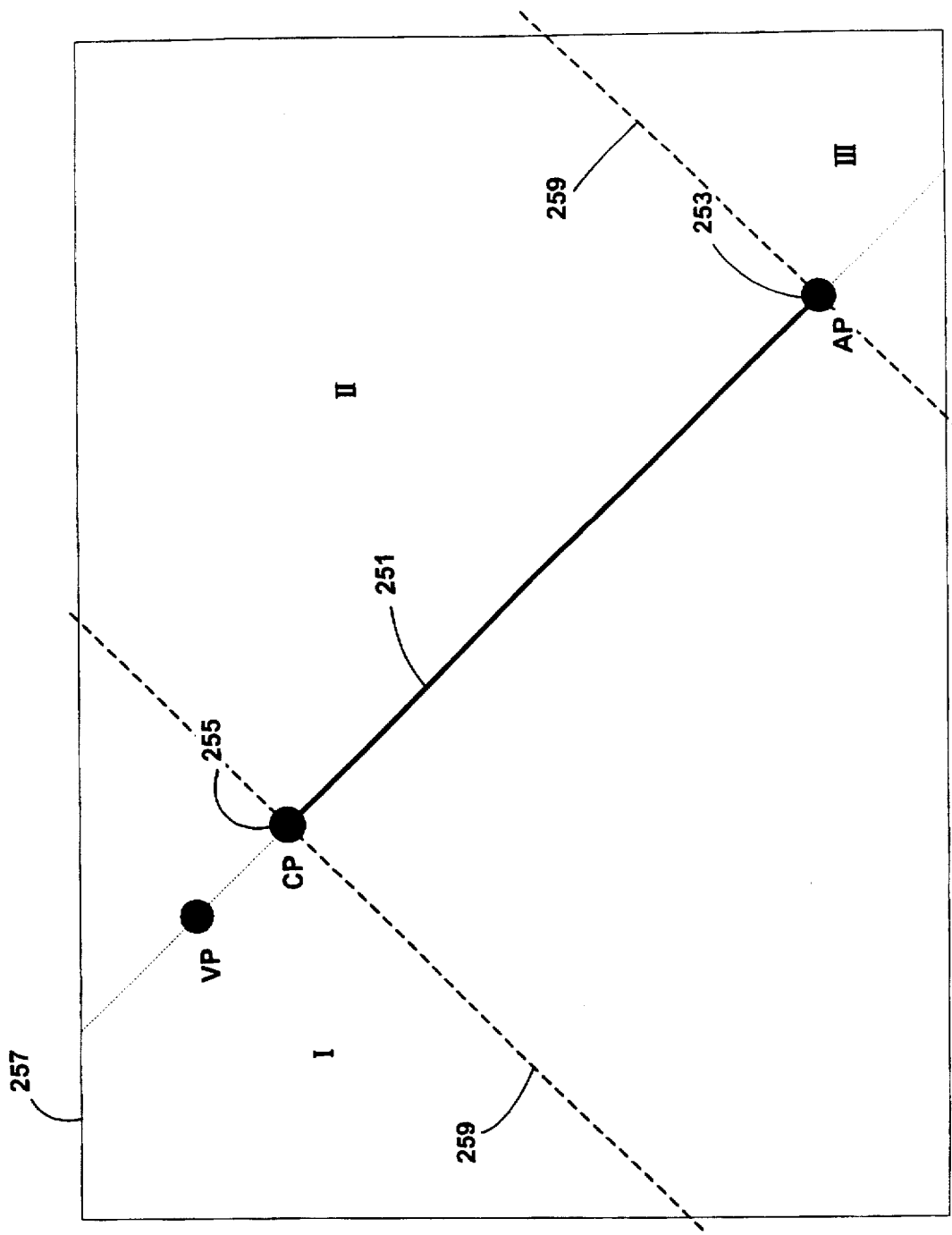
FIG. 9 is an exemplary screen display showing a guiding line.

The function of constrainBetween( ) is graphically illustrated in FIG. 9, in which guiding line 251 having appearing point 253 and clamped vanishing point 255 is displayed in viewport 257. Lines 259 passing through appearing point 253 and clamped vanishing point 255 divide viewport 257 into three sectors: I, II and III. As first calculated, screenchoice might fall anywhere along guiding line 251 including those portions that extend into sectors I and III. constrainBetween( ) adjusts screenchoice as necessary in the following manner:

If the originally calculated screenchoice falls in sector I, constrainBetween( ) sets the value of screenChoice to clamped vanishing point 255.

If the originally calculated screenChoice falls in sector II, constrainBetween( ) does not change the value of screenchoice.

Finally, if the originally calculated value of screenchoice falls in sector III, constrainBetween( ) sets the value of screenChoice to appearing point 253.

At this point, the final value of screenChoice has been determined and it is mapped back into world space coordinates at steps 216, 217 and 218 in the manner described above.

GUIDING PLANE

The situation in which a user moves a 3D object along a guiding plane is now explained in more detail. A plane displayed on a CRT as existing in 3D space falls into one of the three categories depicted in FIGS. 10(a), 10(b) and 10(c).

In case [A'] (FIG. 10(a)), the guiding plane is parallel to the view plane and thus does not have a horizon line.

In case [C'] (FIG. 10(c)), the guiding plane is perpendicular to the view plane. As a result, the eye looks straight down the guiding plane which appears as a single line on the screen.

In case [B'] (FIG. 10(b)), guiding plane 131 is neither parallel nor perpendicular to the view plane and thus has a visible dimension terminating at horizon line 133. Cursor positions on the side of horizon line 133 that are occupied by guiding plane 131 (in the case of FIG. 10(b), e.g., points below horizon line 133) will intersect nicely with guiding plane 131. In that case, a cursor location may be cast into world space and intersected with the world space plane to arrive at an object placement point.

In contrast, screen locations in FIG. 10(b) above horizon line 133 (i.e., in the "sky") do not have a natural mapping location on guiding plane 131. If these locations are cast as world space lines and intersected with guiding plane 131, the resulting object placement point will be located behind the viewers head!

FIG. 11 provides a graphic illustration of how a robust mapping can be achieved when the motion of an object is constrained to points along a guiding plane. When cursor 123 is positioned in sky 263, the mapping point onto guiding plane 131 is determined by constructing a perpendicular line between cursor point 123, horizon line 133 and appearing line 261. The appearing line is analogous to the appearing point and is defined as the line where the guiding plane intersects the near clipping plane. The appearing line and horizon line are parallel. By well-known geometry, the perpendicular line extending from cursor 123 to appearing line 261 intersects horizon line 133 at the point that is closest to cursor position 123 in screen space. Using this mapping, the object drags back and forth on horizon line 133 tracking the cursor as it moves through the sky.

Note, however, that screen points near the horizon line map to near-infinite distances. As in the case of guiding lines, therefore, an appropriate VANISH_FACTOR is selected and used to calculate a clamped vanishing point at which the object is placed. This yields a natural and continuous motion of the object about the guiding plane for every possible cursor position.

What follows in Table IV is pseudocode for a routine—projectToPlane( )—that implements the above-described robust mapping scheme for constraining cursor motion to a guiding plane. This routine is a straightforward extension of the approach taken with guiding lines.

TABLE IV

```
boolean projectToPlane( wldPlane, cursor, &result)
{
    // To start, assume cursor is over plane.
    screenChoice = cursor;
    // Is the plane parallel to the screen?
    hasHorizon = !areParallel( wldPlane.normal, wldEyeDir );
    if ( hasHorizon ) {
        // Find two vanishing points.
        // noVanishDir lies in both viewPlane & wldPlane
        noVanishDir = cross( wldEyeDir, wldPlane.normal );
        normalize (noVanishDir)
        // These are not in the viewPlane. Both vanish when
        // projected to screen, unless plane is edge-on to eye.
        wldDir1 = cross( noVanishDir, wldPlane.normal );
        wldDir2 = (noVanishDir + wldDir1 );
        normalize( wldDir2 );
        wldLine1 = makeLine2( wldPlane.point, wldDir1);
        wldLine2 = makeLine2( wldPlane.point, wldDir2);
        hasVanish1 = getVanishingPoint(wldLine1,vanish1);
        hasVanish2 = getVanishingPoint(wldLine2,vanish2);
        // Unless both vanish, plane is edge-on
        if ( not( hasVanish1 ) or not ( hasVanish2 )
            return FALSE;
        horizon = makeLine( vanish1, vanish2 );
        // Connect appearing points for appearLine
        getAppearingPoint( wldLine1, appear1 );
        getAppearingPoint( wldLine2, appear2 );
        appearLine = makeLine( appear1, appear2 );
        // Find closest point on each line to screenChoice
        vanish = closestToPoint( horizon, screenChoice );
        appear = closestToPoint( appearLine,screenChoice);
        // Plane is edge-on if these overlap
        if (vanish == appear)
            return FALSE;
        // Get clamped point for our choice's line.
        clamp = interp(vanish, appear, VANISH_FACTOR);
        // Constrain choice to lie between appear and clamp
        constrainBetween( appear, clamp, screenChoice );
    }
    // Project choice to world space, intersect with wldPlane
    choiceWldLine = getWorldSpaceLine( screenChoice );
    result = closestToLine( wldPlane, choiceWldLine );
    return TRUE;
}
```

The projectToPlane( ) routine receives "wldplane"—a data structure that defines the guiding plane in world space and "cursor"—the cursor position in screen coordinates—as inputs.

The horizon and appearing lines for a plane are always parallel. The closer together they are, the nearer our view is to being edge-on. When they are coincident, the plane is viewed exactly edge-on (case [C']). In that case, projectToPlane( ) returns FALSE because the entire guiding plane maps to a single line on the screen and meaningful dragging is impossible. If the guiding line falls either in case [A'] or case [B'], projectToPlane( ) returns "result," a world space point on the guiding plane representing the placement point for the object. The logic underlying the projectToPlane( ) routine is illustrated by the flowchart of FIG. 12.

The first step is to initialize the value of screenChoice to the cursor position in step 300.

At step 302, it is determined if the guiding plane is parallel to the view plane (case [A']) by checking whether or not the guiding plane has a horizon line. A plane has a horizon line if the world eye direction is not parallel to the normal of the plane in world space. To make this determination, areParallel( ) receives two world space lines as input—a first line that is normal to the guiding plane (wldPlane.normal) and a second line representing the world eye direction (wldEyeDir)—and tests whether they are parallel. The result of areParallel( ) is negated (using the "!" symbol) and the result is stored in hasHorizon.

If hasHorizon is false, meaning that the guiding plane has no horizon line, every point on the guiding plane has a natural and well-defined mapping point on the screen, and no danger exists that the object will move along the guiding plane in an erratic or discontinuous fashion. In that case, the flow skips to steps 318–322 where screenChoice is projected as a line into world space and that line is then intersected with the guiding plane. The intersection point, representing the point in world space on the guiding plane at which the 3D object is to be placed, is returned in "result." The calculations performed in steps 318–322 are nearly identical to steps 216–220 in the flowchart of FIG. 7, the only difference being that, in steps 318–322, closestToLine( ) finds the intersection point between a line and a plane, rather than between two lines.

If it is determined at step 302 that the guiding plane has a horizon line, screenChoice may need to be adjusted to prevent the object from moving along the guiding plane in an erratic or discontinuous fashion. Whether or not screen-Choice needs to be adjusted depends on its position relative to the guiding plane's horizon line and appearing line. Accordingly, the first order of business is to find the horizon and appearing lines for the guiding plane.

All vanishing points for lines within a plane have vanishing points located on the horizon. The horizon line may be constructed by finding two lines in the plane with unique directions, calculating their vanishing points, and then connecting these two vanishing points. Similarly, the appearing line is constructed by finding and connecting the appearing points for the same two unique lines. Care must be taken to find two lines that do not lie within the view plane because such lines do not have vanishing points, and thus cannot be used to construct the horizon line. Nor may the two unique lines be parallel to one another or else they would have the same vanishing point and it is impossible to create a line from a single point. Accordingly, the two unique lines to be found must satisfy three conditions: (i) they are in the motion plane, (ii) they are not parallel to the view plane; and (iii) they are not parallel to each other.

The flowchart of FIG. 13 illustrates the logic used to identify two such lines. First, in step 330, a line that lies both in the guiding plane and in the view plane is found by using the cross( ) routine to calculate the cross product of the world eye direction (wldEyeDir) and the normal of the guiding plane in world space (wldPlane.normal). By definition, the cross product of two vectors is perpendicular to both of the vectors so long as they are not parallel to each other, and it has already been confirmed in step 302 (FIG. 12) that wldEyeDir and wldPlane.normal are not parallel.

The world eye direction is perpendicular to the view plane. Because noVanishDir is by operation of the cross product perpendicular to the world eye direction, it necessarily lies within the view plane. In addition, since the cross product result is perpendicular to the normal of the guiding plane, noVanishDir also lies within the guiding plane.

Next, at step 332, noVanishDir is used to create a direction (wldDir1) within the guiding plane that is not parallel to the horizon line and thus has a vanishing point. This is accomplished by taking the cross product of noVanishDir and the normal of the world plane. Because noVanishDir lies within the guiding plane it cannot be parallel to the normal to the guiding plane. Consequently, the cross product result (wldDir1) is assured to be perpendicular both to noVanishDir and to the normal of the guiding plane. Because wldDir1 is perpendicular to the normal of the guiding plane it necessarily lies within the guiding plane, thus satisfying condition (i) above. Because wldDir1 is perpendicular to noVanishDir (which is parallel to the horizon line) it cannot be parallel to the horizon line, thus satisfying condition (ii).

At step 334, a second direction (wldDir2) satisfying both conditions is found by adding the first direction (wldDir1) and noVanishDir and normalizing the result to a unit direction. This operation is illustrated in FIG. 14. Because noVanishDir 351 and wldDir1 352 each lie within the guiding plane, so must their sum (wldDir2 354) thus satisfying condition (i). Because novanishdir 351 is perpendicular, and thus not parallel, to wldDir1 352, wldDir2 354—the sum of noVanishDir and wldDir1—cannot be parallel to noVanishDir 351 (which is parallel to the horizon line). Consequently, wldDir2 354 cannot be parallel to the horizon line, thus satisfying condition (ii). Similarly, because noVanishDir is perpendicular, and thus not parallel, to wldDir1, wldDir2—the sum of noVanishDir and wldDir1—cannot be parallel to wldDir1, thus satisfying condition (iii).

wldDir1 and wldDir2 are made into lines wldLine1 and wldLine2 using the makeLine2( ) procedure, which creates a line by using a direction and point—in this case, the defining point of the world plane.

Once the two unique lines are found, their respective vanishing points (vanish1 and vanish2) are calculated at step 336 using getVanishingPoint( ) in the manner described above. If either of these two lines receives FALSE from getVanishingPoint( ), it means that that line passes through the eye and that the guiding plane falls into case [C']. In that event, projectToPlane( ) returns FALSE indicating that meaningful movement along the guiding plane is impossible.

At step 338, the horizon line is constructed by connecting vanish1 and vanish2 using makeLine().

Returning to FIG. 12, the appearing line is constructed at step 306 by calling getAppearingPoint( ) twice to find the appearing points (appear1 and appear2) of the two unique lines. makeLine( ) connects these points to form a line.

At steps 308 and 310, closestToPoint( ) is invoked twice to find the points on the horizon line and on the appearing line that are closest to screenChoice. The effect of steps 308 and 310 is illustrated in FIG. 11. Essentially, an imaginary guiding line 265 is dropped from screenChoice 123 to intersect horizon line 133 and appearing line 261 at right angles. Imaginary guiding line 265 has a vanishing point ("vanish") at its intersection with horizon line 133 and an appearing point 261 ("appear") at its intersection with appearing line 261. This effectively simplifies the guiding plane problem into a guiding line problem, which can be solved using the techniques described previously.

At step 312, the vanishing and appearing points of the imaginary guiding line are compared, and if found to be equal, projectToPlane( ) returns FALSE, indicating that the guiding plane is oriented edge-on in screen space (case [C']). Because meaningful dragging of the object is impossible in that case, the routine terminates and waits for the next new cursor position.

At steps 314 and 316, the clamping point for the imaginary guiding line is determined and screenChoice is constrained to lie between the imaginary guiding line's clamping point and appearing point. These steps are identical to steps 212 and 214 in FIG. 7.

Finally, at steps 318–322, screenChoice is projected as a line into world space and this line is intersected with the guiding plane to determine the point in world space on the guiding plane at which the 3D object is to be placed.

Of the various routines discussed above—including normalize( ), intersect( ), interp( ), cross( ), areParallel( ), makeLine( ), makeLine2( ), makePlane( ), closestToPoint( ), closestToLine( ), getScreenSpaceLine( ), getWorldspaceLine( ), and constrainBetween( )—many are available in standard libraries and all may be implemented using well-known principles of geometry and computer graphics techniques.

Other embodiments are within the scope of the following claims.

What is claimed is:

1. A method of mapping a moving 2D cursor onto a guiding entity in a virtual 3D space displayed on a 2D surface, comprising:

determining if the guiding entity has a characteristic that may yield a discontinuity in motion along the guiding entity when the moving cursor is mapped onto the guiding entity; and mapping the cursor onto the guiding entity based on a result of the determining.

2. The method of claim 1 in which the guiding entity comprises a line.

3. The method of claim 2 in which the characteristic comprises a vanishing point.

4. The method of claim 1 in which the guiding entity comprises a plane.

5. The method of claim 4 in which the characteristic comprises a horizon line.

6. The method of claim 1 in which the mapping includes finding a location on the guiding entity that is closest to the 2D cursor position in screen space.

7. The method of claim 1 in which the mapping includes limiting the mapped position on the guiding entity to a constrained region.

8. The method of claim 7 in which the guiding entity comprises a plane or a line and the constrained region lies between a view plane and either a horizon line or a vanishing point, inclusive.

9. The method of claim 7 in which the guiding entity comprises a plane or a line and the constrained region lies between an appearing position and a clamped position, inclusive.

10. The method of claim 7 in which an object is being manipulated along the guiding entity and the limiting permits the object to be seen and manipulated.

11. The method of claim 1 in which the mapping includes limiting the mapped position on the guiding entity to a position that is no closer to an eye position than a position of a view plane.

12. The method of claim 1 further comprising rotating, scaling, or translating an object based on the mapping.

13. A method of mapping 2D cursor coordinates onto a guiding entity in 3D space, said method comprising:

determining a point on the guiding entity that is closest to the 2D cursor position in screen space; and choosing a mapped position on the guiding entity based on a result of the determining.

14. The method of claim 13 in which a result of the determining corresponds to a point on the guiding entity at which a perpendicular line can be drawn to the 2D cursor position.

15. The method of claim 13 further comprising:

modifying the mapped position such that a 3D object placed at the modified mapped position is between a view plane and a point beyond which the 3D object cannot be seen and manipulated.

16. A method of mapping a 2D position of a displayed cursor to a mapped position of a 3D object on a guiding element that lies within a displayed virtual 3D space, said method comprising:

determining if the mapped position of the 3D object on the guiding element would render the object imperceptible or not manipulatable; and if so, shifting the mapped position to one at which the 3D object would be perceptible or manipulatable.

17. The method of claim 16 in which the shifted mapped position is between an appearing position and a clamped position, inclusive.

18. A method of mapping 2D cursor coordinates onto a guiding entity in 3D space, said method comprising:

determining a point on the guiding entity at which it intersects a view plane; and choosing a mapped position on the guiding entity based on the 2D cursor coordinates and on a result of the determining.

19. A method of mapping 2D cursor coordinates onto a guiding line in 3D space, said method comprising:

determining a direction of the guiding line in affine space;

finding a vanishing point for the guiding line by constructing a line in affine space that passes through an eye point and that has the same direction as the guiding line; and choosing a mapped position on the guiding line based on the 2D cursor position and on the vanishing point.

20. A method of mapping 2D cursor coordinates onto a guiding plane in 3D space, said method comprising:

finding first and second lines that lie within the guiding plane;

determining a vanishing point for each of the first and second lines;

constructing a horizon line for the guiding plane by connecting the vanishing points for the first and second lines; and choosing a mapped position on the guiding plane based on the 2D cursor position and on the constructed horizon line.

21. The method of claim 20 in which the first and second lines determined by the determining are not parallel to the view plane and are not parallel to each other.

22. A method of mapping a sequence of 2D positions of a displayed cursor onto a sequence of positions along a guiding element that lies within a displayed virtual 3D space, said method comprising selectively applying one or the other of two different mapping strategies to different ones of the 2D positions.

* * * * *